(12) United States Patent
Parodi

(10) Patent No.: US 11,366,221 B1
(45) Date of Patent: Jun. 21, 2022

(54) USING PSEUDORANDOM SIGNALS TRANSMITTED FROM DISTRIBUTED SOURCES IN RANGING OPERATIONS

(71) Applicant: Amazon Technologies, Inc., Seattle, WA (US)

(72) Inventor: Carlos Parodi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 513 days.

(21) Appl. No.: 16/174,020

(22) Filed: Oct. 29, 2018

(51) Int. Cl.
*G01S 15/32* (2006.01)
*G01S 15/93* (2020.01)
*G06F 7/58* (2006.01)
*G01S 7/534* (2006.01)

(52) U.S. Cl.
CPC ............ *G01S 15/325* (2013.01); *G01S 7/534* (2013.01); *G01S 15/93* (2013.01); *G06F 7/582* (2013.01)

(58) Field of Classification Search
CPC ........ G01S 15/325; G01S 7/534; G01S 15/93; G06F 7/582
USPC ......................................................... 367/99
See application file for complete search history.

(56) References Cited

U.S. PATENT DOCUMENTS

| 2,470,114 A | 5/1949 | Sherwood et al. |
| 6,434,085 B1 * | 8/2002 | Nedwell ............... G01S 15/104 367/101 |
| 10,891,868 B1 | 1/2021 | Parodi |
| 2010/0067330 A1 | 3/2010 | Collier et al. |
| 2015/0071031 A1 | 3/2015 | Siedenburg et al. |

FOREIGN PATENT DOCUMENTS

| CN | 108267745 A | 7/2018 |
| WO | 2017219470 A1 | 12/2017 |
| WO | 2017219471 A1 | 12/2017 |

OTHER PUBLICATIONS

"Cross-correlation," Wikipedia, downloaded Apr. 5, 2021 from https://en.wikipedia.org/wiki/Cross-correlation, 7 pages. (Year: 2020).*
"Pulsed vs. CW Signals: Both Loom on a Designer's Radar," Microwaves & RF, downloaded Apr. 17, 2021 from https://www.mwrf.com/technologies/systems/article/21849213/pulsed-vs-cw-signals-both-loom-on-a-designers-radar, 7 pages. (Year: 2021).*

(Continued)

*Primary Examiner* — Daniel L Murphy
(74) *Attorney, Agent, or Firm* — Athorus, PLLC

(57) ABSTRACT

Ranging systems operate based on the transmission and receipt of pseudorandom sequences. Pseudorandom sequences may be generated and assigned to specific transmitters, which may operate simultaneously to transmit signals including the pseudorandom sequences. A receiver may be programmed to recognize the specific pseudorandom sequences within data captured by the receiver, and to associate the pseudorandom sequences with the transmitters that transmitted them. Upon identifying the pseudorandom sequences, the receiver or one or more associated components may calculate times of flight of signals transmitted by the respective transmitters. Such times of flight may be used to calculate distances to one or more objects from which the signals were reflected.

19 Claims, 18 Drawing Sheets

(56) References Cited

OTHER PUBLICATIONS

Echoview, "About Transmitted Pulses," URL:https://support.echoview.com/WebHelp/Data_Processing/About_tranmitted_pulses.htm, retrieved on Jul. 28, 2021, 2 pages.
WO2017219470-A1 Translation (Year: 2017).
Wikipedia, "Phased array ultrasonics," www.wikipedia.com, Wikipedia: The Free Encyclopedia, 3 pages, Jul. 20, 2017, URL: https://en.wikipedia.org/wiki/Phased_array_ultrasonics, obtained via web.archive.org on Jan. 27, 2022.
Wikipedia, "Phased array," www.wikipedia.com, Wikipedia: The Free Encyclopedia, 15 pages, Aug. 26, 2018, URL: https://en.wikipedia.org/wiki/Phased_array, obtained via web.archive.org on Jan. 27, 2022.

\* cited by examiner

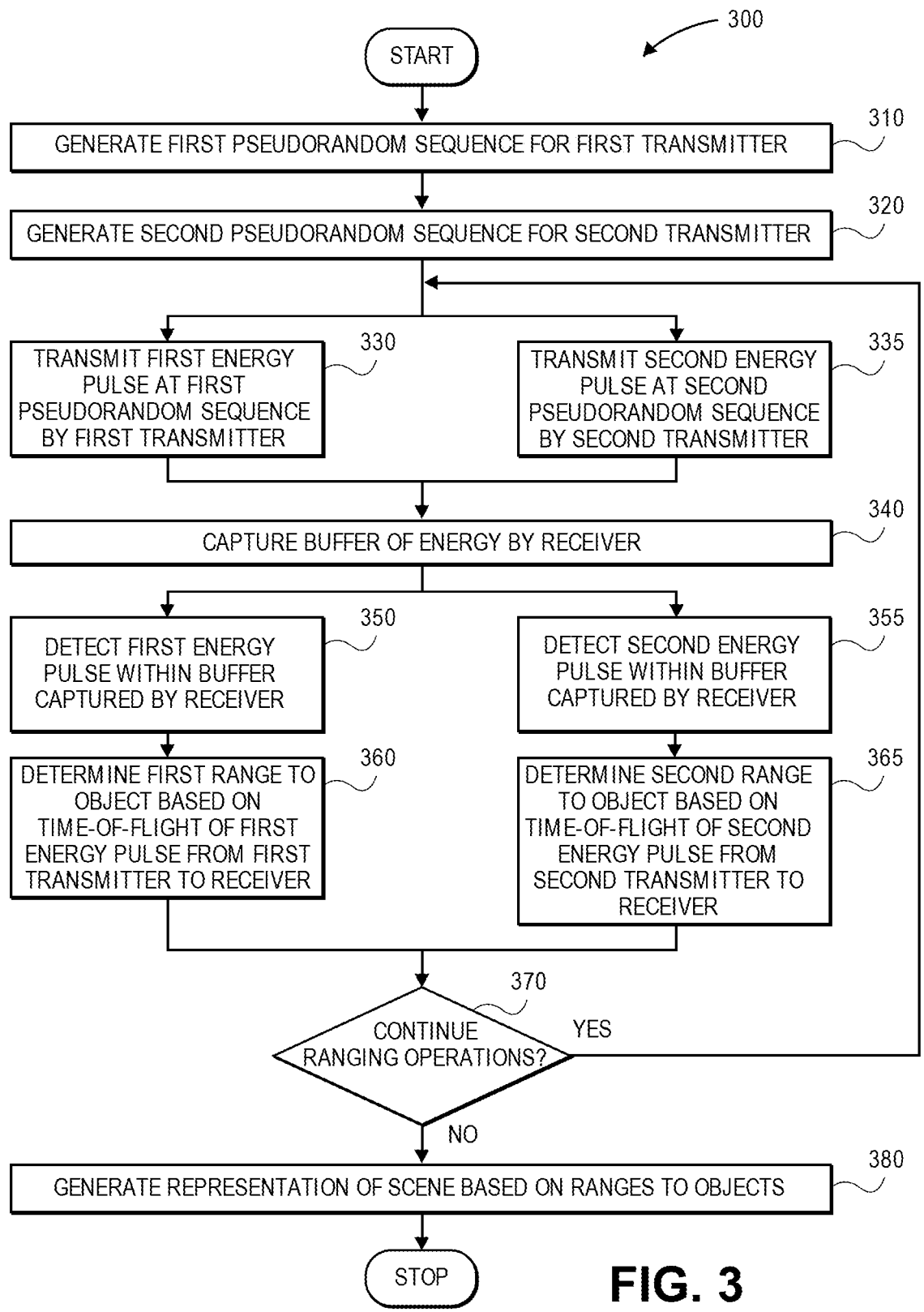

ial vehicle 110
USING PSEUDORANDOM SIGNALS TRANSMITTED FROM DISTRIBUTED SOURCES IN RANGING OPERATIONS

BACKGROUND

Many ranging systems, including but not limited to sonar systems, operate with a single transmitting element for transmitting energy (e.g., acoustic pulses or signals) and a single element for receiving reflections of the energy (e.g., echoes). Where a receiver is omni-directional in nature, the presence of an object, but not a bearing or distance to the object, may be determined. Where a receiver is directional in nature, a bearing to an object may be determined. Therefore, in order to detect or determine bearings or distances to objects in multiple directions, the transmitter and receiver may be steered by adjusting times at which signals are transmitted, or by manipulating data captured by the receiver. One technique for selecting times at which signals are to be transmitted, or manipulating data captured using a receiver, is called synthetic aperture, in which signals are transmitted by an array of transmitters and received by an array of receivers.

During synthetic aperture operation, however, the arrays of transmitters and receivers typically act as single-point sources of signals and single-point destinations for such signals. Where surfaces of objects are not properly aligned with respect to directions of the transmitted angles, however, the transmitted signals are less likely to be reflected from such surfaces in directions of the receivers, and may not be properly detected.

BRIEF DESCRIPTION OF THE DRAWINGS

FIG. 3 is a flow chart of one process for using pseudorandom signals transmitted from distributed sources in ranging operations in accordance with embodiments of the present disclosure.

DETAILED DESCRIPTION

As is set forth in greater detail below, the present disclosure is directed to the use of pseudorandom signals transmitted from distributed sources in ranging operations. More specifically, the systems and methods of the present disclosure are directed to assigning pseudorandom sequences to each of a plurality of transmitters or transmitting elements that are mounted at distributed locations with respect to one another and also with respect to one or more receivers or receiving elements. The transmitters and receivers may be components of a ranging system, such as a sonar system or radar system, that may be fixed or mobile in nature. The pseudorandom sequences may be selected in any manner and on any basis, such as by a binary shift register or a linear-feedback shift register, and preferably have strong auto-correlation qualities and weak cross-correlation qualities. The transmitters may be configured to transmit pulses of energy including their respectively assigned pseudorandom sequences simultaneously or nearly simultaneously, and the receivers may capture buckets of data or energy regarding reflections of such pulses from one or more objects. The reflections of the pulses may be separately interpreted by the receivers, or by one or more systems with which the receivers are associated, which may match energy received by such receivers with energy transmitted by a specific transmitter, in order to calculate ranges to one or more objects based on such reflections.

The use of transmitters or transmitting elements at distributed locations with respect to one another and also with respect to one or more receivers or receiving elements enhances a probability that one or more reflections of the pulses are received by the one or more receivers, regardless of surface conditions or other operating conditions in an area where such systems and methods are operated. For example, by transmitting pulses including pseudorandom sequences from the different locations, the likelihood that one or more of the pulses will be reflected to the one or more receivers, even if one or more of the pulses is subject to specular reflections or other phenomena, and regardless of an orientation or configuration of the objects from which the pulses are reflected, is substantially increased. Moreover, where each of the pulses includes a pseudorandom sequence that has been assigned to one of the transmitters, the pulses that are reflected from such objects and received by the one or more receivers may be specifically identified.

Figure 1A:
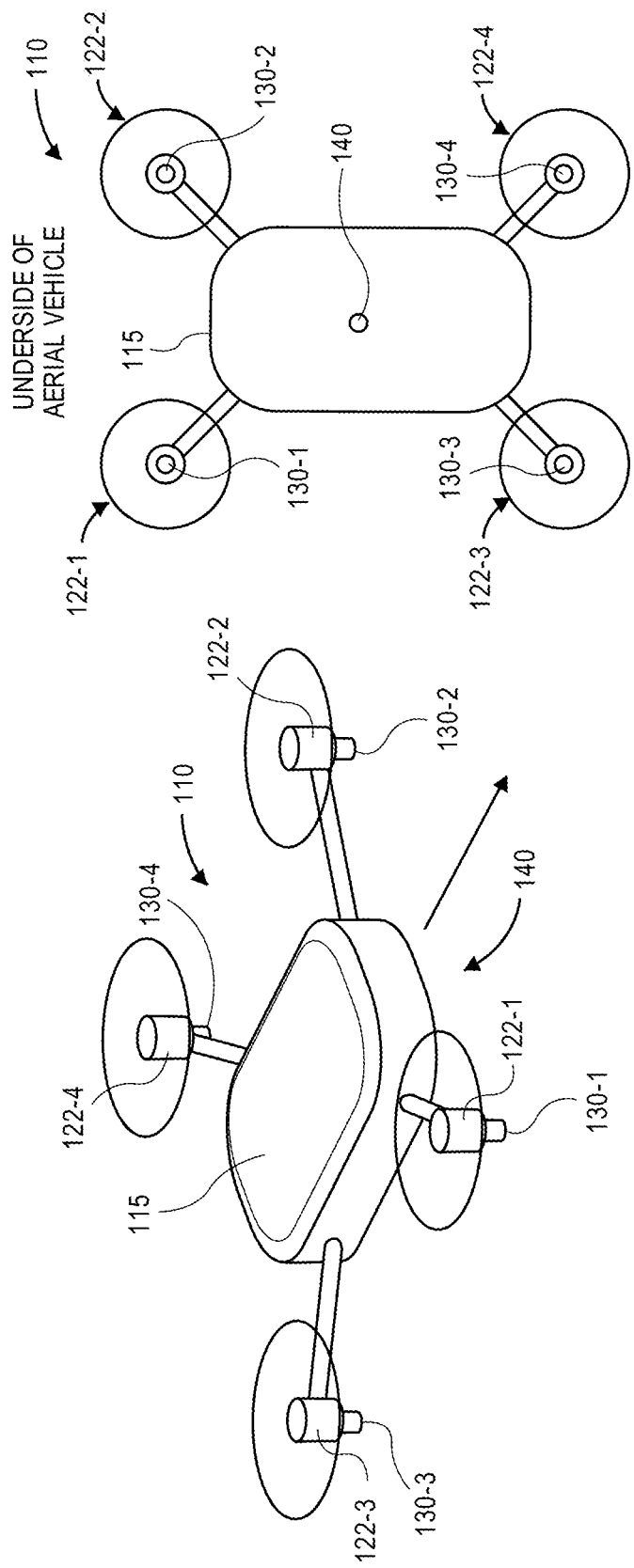
FIGS. 1A through 1F are views of aspects of one system for using pseudorandom signals transmitted from distributed sources in ranging operations in accordance with embodiments of the present disclosure.

Referring to FIGS. 1A through 1F, an aerial vehicle 110 is shown. As is shown in FIG. 1A, the aerial vehicle 110 has a frame 115 and is traveling under power of four propulsion motors 122-1, 122-2, 122-3, 122-4 that are mounted to the frame 115. On an underside of the aerial vehicle 110, a plurality of transmitters 130-1, 130-2, 130-3, 130-4 are mounted to the respective propulsion motors 122-1, 122-2, 122-3, 122-4, and a receiver 140 is mounted to the frame 115.

By mounting the transmitters 130-1, 130-2, 130-3, 130-4 to the propulsion motors 122-1, 122-2, 122-3, 122-4, the transmitters 130-1, 130-2, 130-3, 130-4 are provided at distributed locations with respect to the receiver 140. For example, as is shown in FIG. 1A, distances between any pair of the transmitters 130-1, 130-2, 130-3, 130-4 are greater than distances between any of the transmitters 130-1, 130-2, 130-3, 130-4 and the receiver 140. In some embodiments, the transmitters 130-1, 130-2, 130-3, 130-4 may be configured to transmit acoustic energy (e.g., sonar signals) or, alternatively, electromagnetic energy (e.g., radar signals), and the receiver 140 may be configured to capture data regarding reflections of any type or form of energy transmitted by the transmitters 130-1, 130-2, 130-3, 130-4. In some embodiments, the receiver 140 may be a single receiving element. In some other embodiments, the receiver 140 may include one or more receiving elements, e.g., a synthetic aperture array of receiving elements.

Figure 1B:
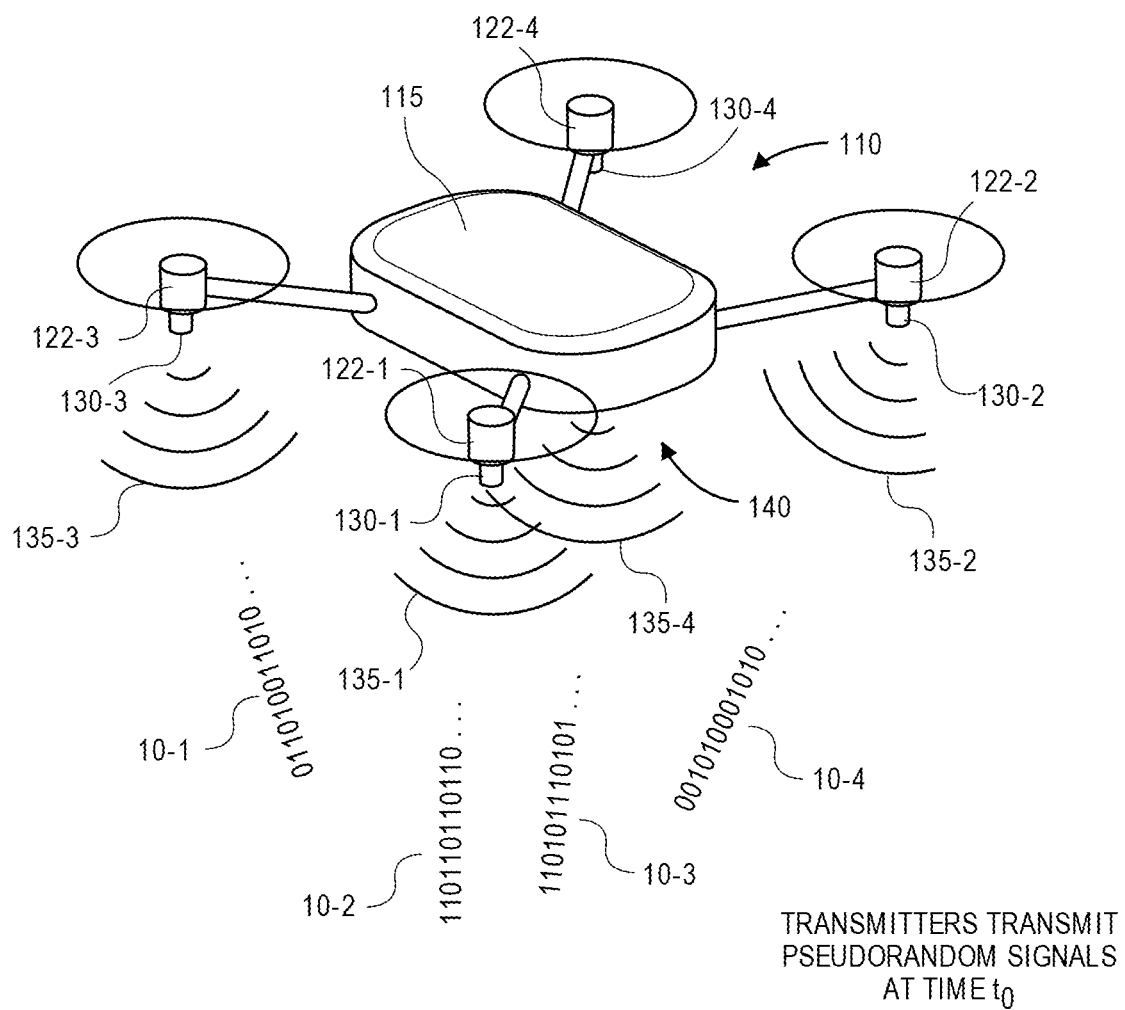

As is shown in FIG. 1B, the transmitters 130-1, 130-2, 130-3, 130-4 are individually programmed to transmit signals 135-1, 135-2, 135-3, 135-4 having discrete, unique pseudorandom sequences 10-1, 10-2, 10-3, 10-4 encoded therein. Each of the signals 135-1, 135-2, 135-3, 135-4 is shown in FIG. 1B in the form of a binary code having a repeated pseudorandom sequence 10-1, 10-2, 10-3, 10-4 encoded therein. The pseudorandom sequences 10-1, 10-2, 10-3, 10-4 preferably have strong auto-correlation qualities, in that the pseudorandom sequences should match themselves only and not shifted versions of themselves, and weak cross-correlation qualities, in that the pseudorandom sequences should not be confused with any of the other pseudorandom sequences. The signals 135-1, 135-2, 135-3, 135-4 are transmitted simultaneously or nearly simultaneously, e.g., at a time to, in a downward direction with respect to an orientation of the aerial vehicle 110. Alternatively, the transmitters 130-1, 130-2, 130-3, 130-4 may be mounted and configured to transmit signals having the pseudorandom sequences 10-1, 10-2, 10-3, 10-4 encoded therein in any direction with respect to an orientation of the aerial vehicle 110, e.g., forward, aft, upward or lateral to the orientation of the aerial vehicle 110. In some embodiments, one or more of the transmitters 130-1, 130-2, 130-3, 130-4 may be directional or omnidirectional in nature.

Figure 1C:
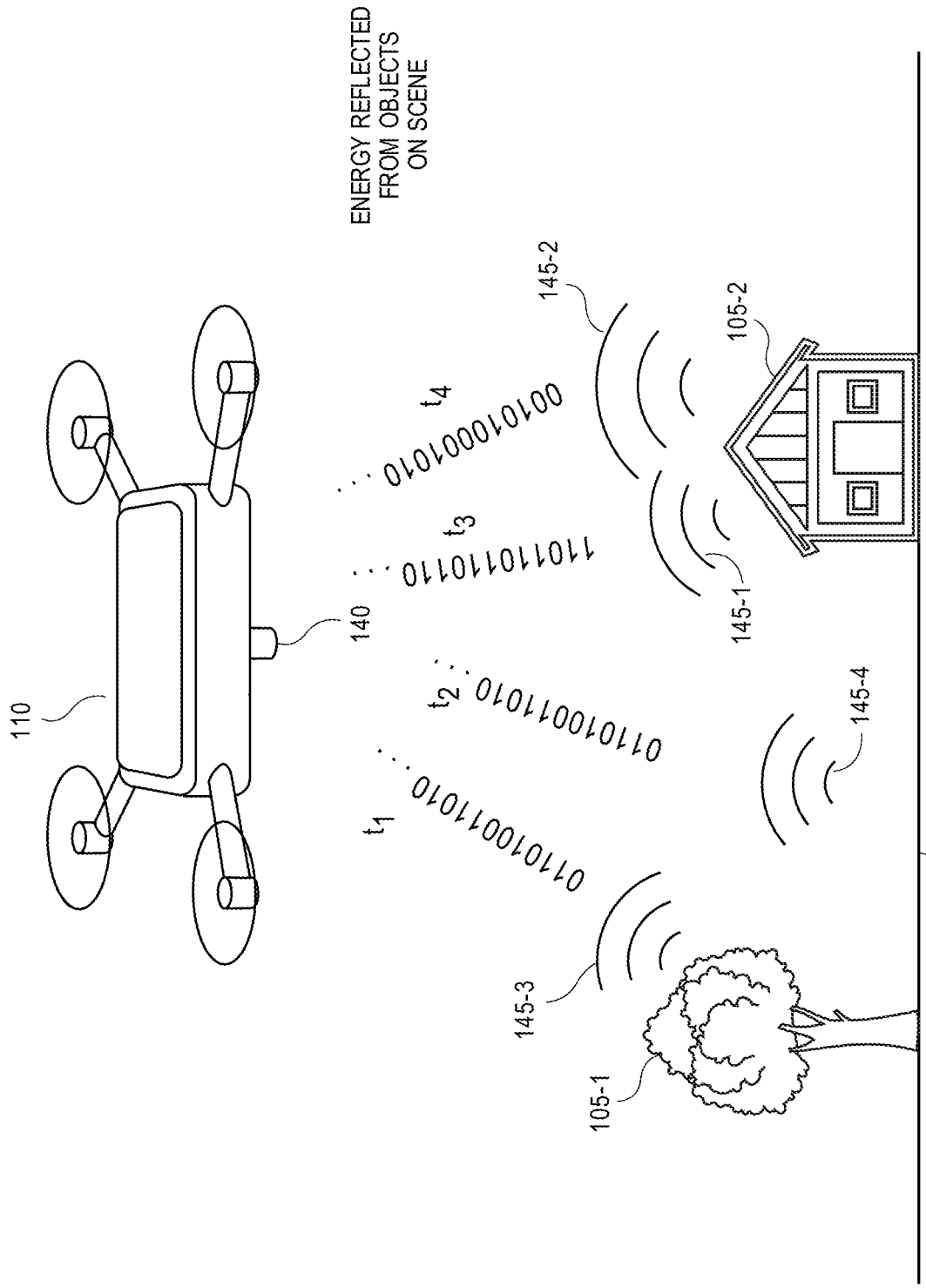
Figure 1D:
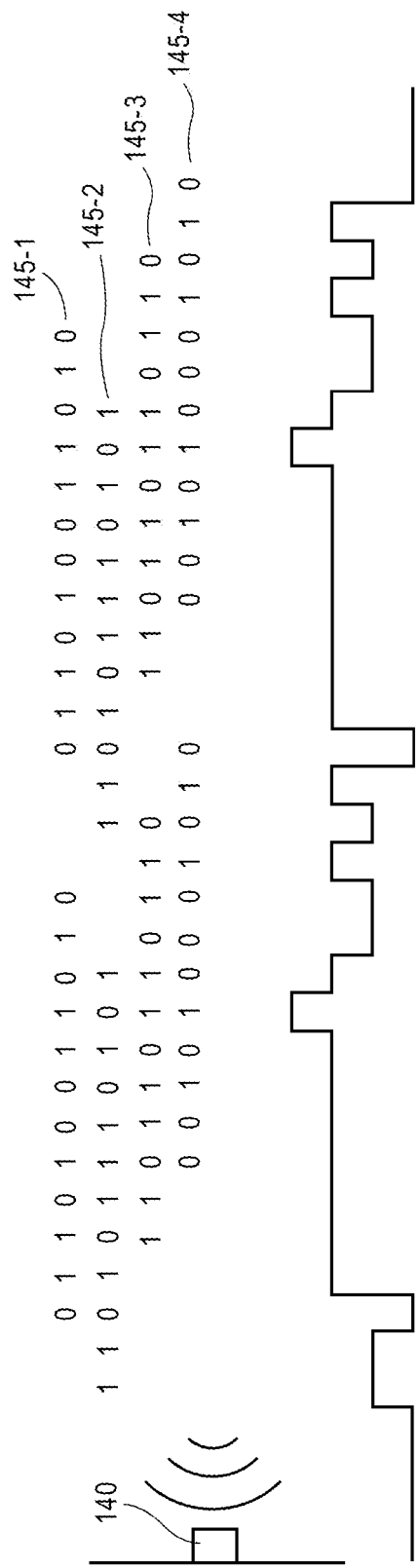

As is shown in FIG. 1C, the receiver 140 captures energy including reflections 145-1, 145-2, 145-3, 145-4 of the signals 135-1, 135-2, 135-3, 135-4 from a plurality of objects 105-1, 105-2, 105-3 beneath the aerial vehicle 110 which, as is shown in FIG. 1C, may include plant life or other natural structures, infrastructure features, buildings or other artificial structures. As is shown in FIG. 1C, the energy including the reflections 145-1, 145-2, 145-3, 145-4 is captured by the receiver 140, e.g., in a buffer, over a period including times $t_1$, $t_2$, $t_3$, $t_4$ following the time to. The reflections 145-1, 145-2, 145-3, 145-4 include the pseudorandom sequences 10-1, 10-2, 10-3, 10-4 encoded into each of the signals 135-1, 135-2, 135-3, 135-4. As is shown in FIG. 1D, the energy captured by the receiver 140, which includes the reflections 145-1, 145-2, 145-3, 145-4, has varying intensities over time.

Figure 1E:
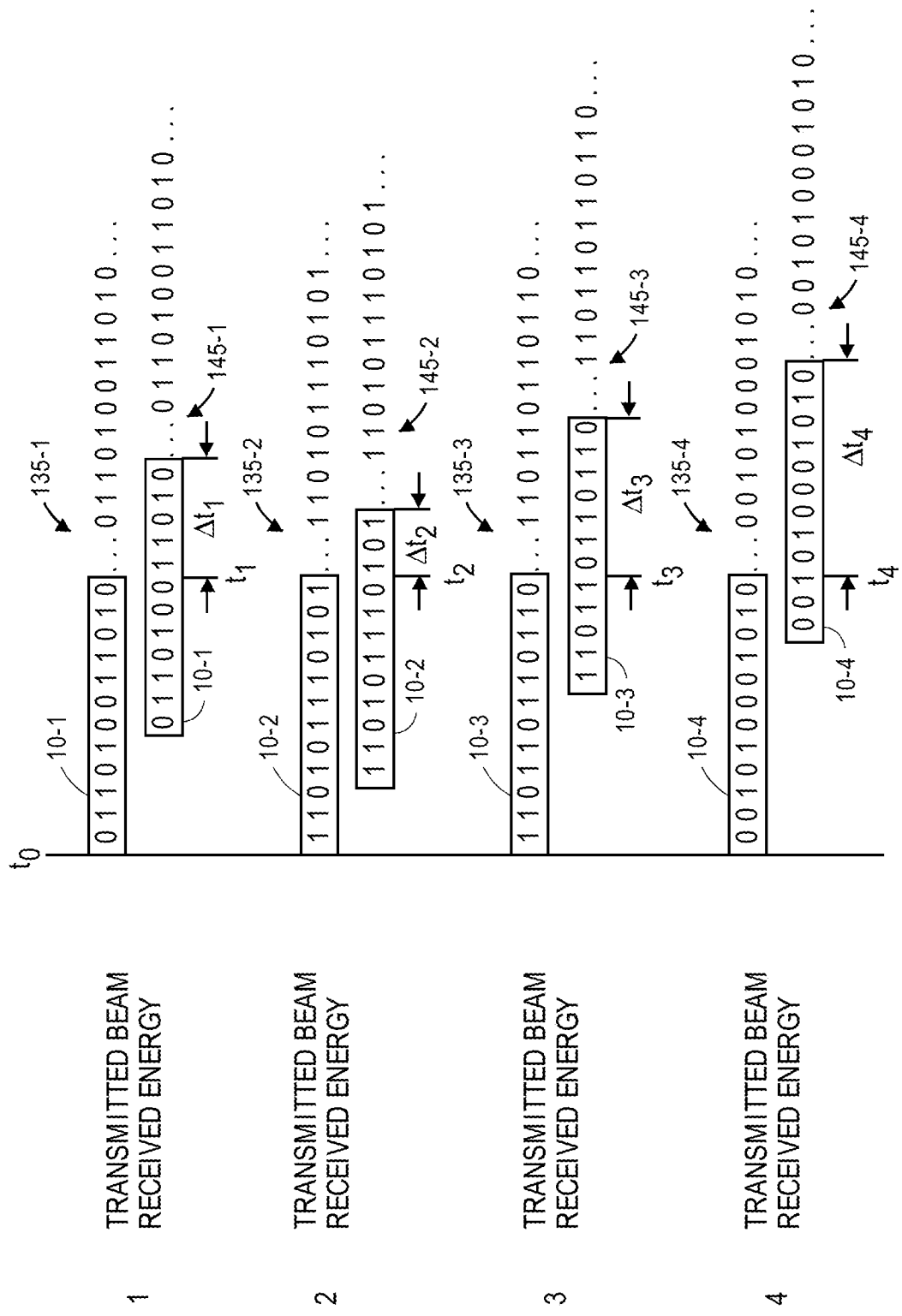

In accordance with the present disclosure, where a signal encoded with a unique pseudorandom sequence is transmitted by a transmitter, and energy including a reflection of the signal is captured by a receiver, a time of flight of the signal may be determined based on a time at which a portion of the signal (e.g., a portion of one of the pseudorandom sequences 10-1, 10-2, 10-3, 10-4) was transmitted, and a time at which the same portion of the signal (e.g., the same portion of the one of the pseudorandom sequences 10-1, 10-2, 10-3, 10-4) was present within data captured by the receiver. Because the signal is encoded with the unique pseudorandom sequence, the signal may be recognized among the energy captured by the receiver. As is shown in FIG. 1E, a time $\Delta t_1$ is determined based on a difference between the time to at which the signal 135-1 including the pseudorandom sequence 10-1 was transmitted, and the time $t_1$ at which the reflection 145-1 including the pseudorandom sequence 10-1 was received. Upon determining that the pseudorandom sequence 10-1, in its entirety, is present within the energy captured by the receiver 140, the time $\Delta t_1$ may be calculated.

Similarly, and as is also shown in FIG. 1E, a time $\Delta t_2$ is determined based on a difference between the time to at which the signal 135-2 including the pseudorandom sequence 10-2 was transmitted, and the time $t_2$ at which the reflection 145-2 including the pseudorandom sequence 10-2 was received, once the pseudorandom sequence 10-2 is determined to be present, in its entirety, within the energy captured by the receiver 140. A time $\Delta t_3$ is determined based on a difference between the time to at which the signal 135-3 including the pseudorandom sequence 10-3 was transmitted, and the time $t_3$ at which the reflection 145-3 including the pseudorandom sequence 10-3 was received, once the pseudorandom sequence 10-3 is determined to be present, in its entirety, within the energy captured by the receiver 140. A time $\Delta t_4$ is determined based on a difference between the time to at which the signal 135-4 including the pseudorandom sequence 10-4 was transmitted, and the time $t_4$ at which the reflection 145-4 including the pseudorandom sequence 10-4 was received, once the pseudorandom sequence 10-4 is determined to be present, in its entirety, within the energy captured by the receiver 140.

Moreover, because the transmitters 130-1, 130-2, 130-3, 130-4 are mounted at distributed locations with respect to one another and also with respect to the receiver 140, a likelihood that one or more of the signals 135-1, 135-2, 135-3, 135-4 will be reflected by the one or more objects 105-1, 105-2, 105-3 to the receiver 140, even if one or more of the signals 135-1, 135-2, 135-3, 135-4 is subject to specular reflections or other adverse phenomena, and regardless of the surface textures or other factors associated with the objects 105-1, 105-2, 105-3, is substantially increased.

Figure 1F:
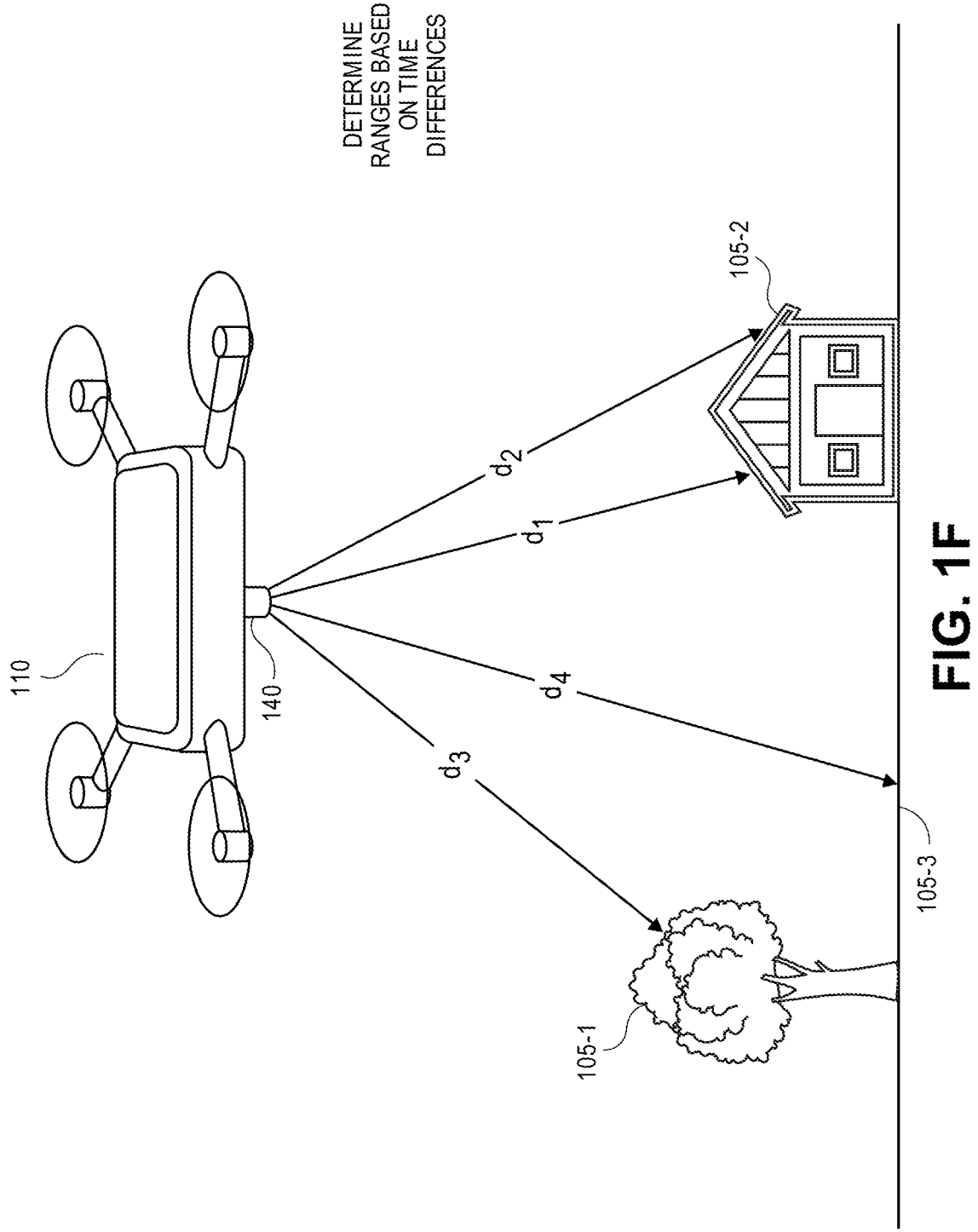

As is shown in FIG. 1F, based on the times $\Delta t_1$, $\Delta t_2$, $\Delta t_3$, $\Delta t_4$, ranges (or distances) $d_1$, $d_2$, $d_3$, $d_4$, to one or more aspects of the objects 105-1, 105-2, 105-3 may be determined, e.g., by dividing products of the times $\Delta t_1$, $\Delta t_2$, $\Delta t_3$, $\Delta t_4$ and a speed of the energy in air, e.g., the speed of sound or the speed of light, by two. Each of the ranges $d_1$, $d_2$, $d_3$, $d_4$ may be independently determined based on the separate times $\Delta t_1$, $\Delta t_2$, $\Delta t_3$, $\Delta t_4$, regardless of whether any of the signals 135-1, 135-2, 135-3, 135-4 is subject to specular reflection or other interference or defects. The ranges $d_1$, $d_2$, $d_3$, $d_4$ may be utilized for any purpose, including but not limited to generating a map or other representation of a scene including the objects 105-1, 105-2, 105-3, including one or more depth images, point clouds, maps or other representations of positions and dimensions of the objects 105-1, 105-2, 105-3. In some instances, where one or more of the signals 135-1, 135-2, 135-3, 135-4 is subject to specular reflections or other adverse phenomena, the times $\Delta t_1$, $\Delta t_2$, $\Delta t_3$, $\Delta t_4$ generated in response to the transmission and receipt of such signals 135-1, 135-2, 135-3, 135-4 may be erratic or indefinite, or the ranges $d_1$, $d_2$, $d_3$, $d_4$ calculated based on such times $\Delta t_2$, $\Delta t_3$, $\Delta t_4$, may be indeterminate. In such instances, ranges to one or more of the objects 105-1, 105-2, 105-3 may be determined from the transmission and receipt of one or more of the signals 135-1, 135-2, 135-3, 135-4 that are not subject to the specular reflections or other adverse phenomena.

Accordingly, the systems and methods of the present disclosure may utilize transmitters that are provided at distinct distances from one another and configured to transmit signals including pseudorandom sequences that are uniquely generated and assigned to the respective transmitters. In some embodiments, a receiver may be programmed to recognize the pseudorandom sequences among captured data and to associate the pseudorandom sequences with the respective transmitters. When a buffer of data regarding reflections of signals transmitted by the transmitters is captured by the receiver, the pseudorandom sequences may be recognized therein, and used to determine times of flight of the respective signals, which may be utilized for any purpose, such as to generate maps or other representations of distances to objects as determined by such systems.

The transmission of energy in waves, and the receipt of reflections of the energy, such as by one or more sonar or radar systems, are commonly used in a number of applications. Sonar, which stands for "sound navigation and ranging," is a technology or procedure by which objects are detected, or distances to such objects are determined, by transmitting acoustic energy (e.g., pulses) and capturing data regarding reflections of such energy (e.g., echoes) from the one or more objects. Objects may be detected based on the reflections of such energy. For example, a bearing or angle to an object may be determined by calculating a bearing or angle from which the reflected energy was received. Additionally, a distance to an object may be determined based on a difference in time between when an acoustic signal is transmitted and when a reflection of such energy is received. Radar, which stands for "radio detection and ranging," is a technology or procedure by which electromagnetic energy in the form of radio waves or other invisible light or energy is transmitted, e.g., in an intermittent beam, and reflections of the energy from one or more objects are detected. As with sonar, objects may be detected, and bearings or angles or distances to such objects may be determined, based on reflections of the energy detected from such objects.

Figure 2:
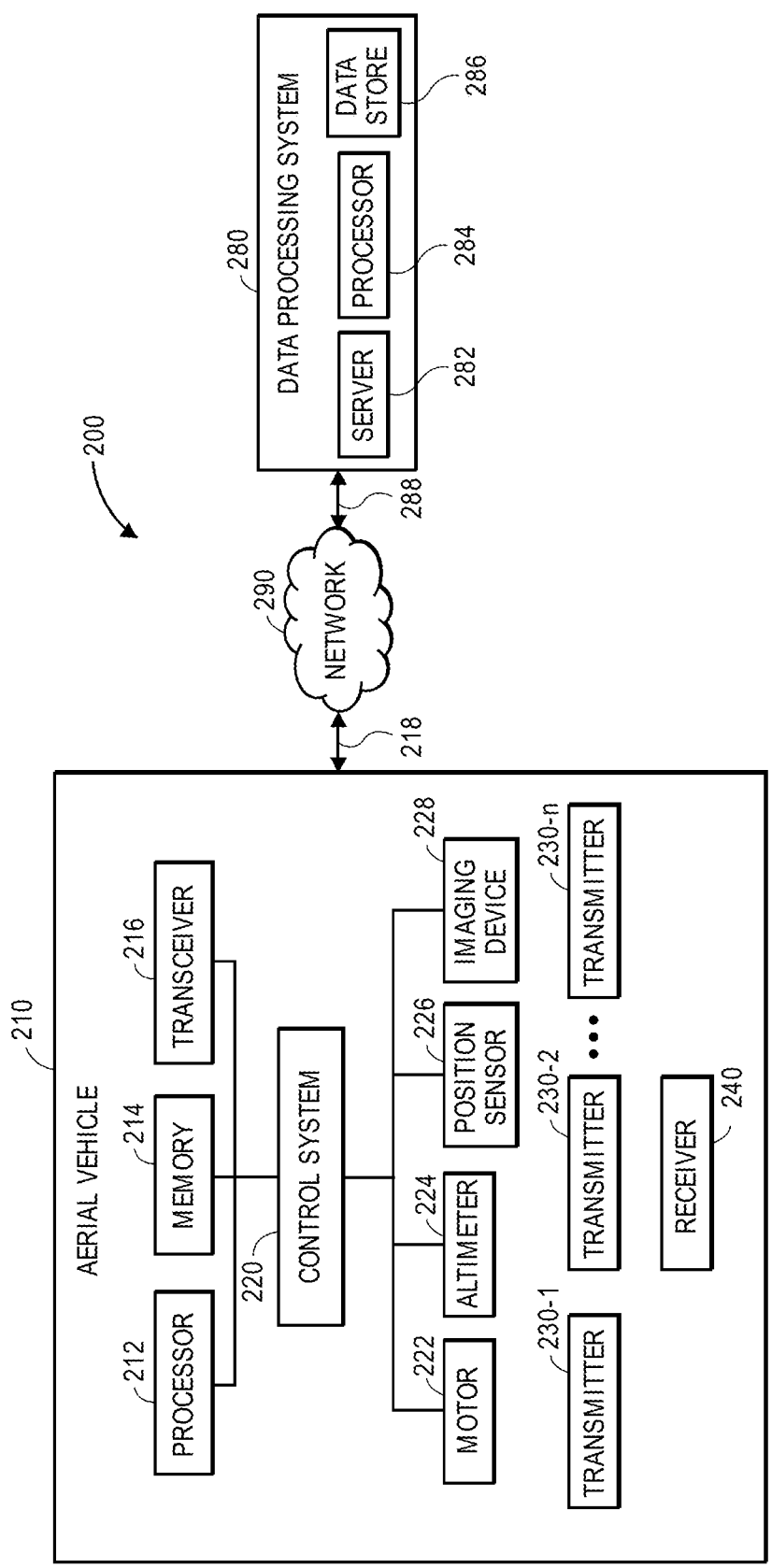
FIG. 2 is a block diagram of one system for using pseudorandom signals transmitted from distributed sources in ranging operations in accordance with embodiments of the present disclosure.

Referring to FIG. 2, a block diagram of one system 200 for using pseudorandom signals transmitted from distributed sources in ranging operations in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1F.

The aerial vehicle 210 includes a processor 212, a memory 214 and a transceiver 216. The aerial vehicle 210 further includes a control system 220, a plurality of propulsion motors 222, an altimeter 224, a position sensor 226 and an imaging device 228. The aerial vehicle 210 also includes a plurality of transmitters (or transmitting elements) 230-1, 230-2 . . . 230-n and a receiver 240 that are mounted or coupled to surfaces of the aerial vehicle 210, such as is shown in FIG. 1A.

The processor 212 may be configured to perform any type or form of computing function associated with the operation of the aerial vehicle 210, including but not limited to the execution of one or more algorithms or techniques, such as by calculating delay times for transmitting one or more signals by the transmitters 230-1, 230-2 . . . 230-n, or by determining bearings or angles from which reflected energy originated based on one or more signals captured by the receiver 240. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 222, the altimeter 224, the position sensor 226 and/or the imaging device 228.

The processor 212 may also control the operation of one or more control systems or modules, such as the control system 220, for generating instructions for conducting operations of one or more of the propulsion motors 222, the altimeter 224, the position sensor 226 and/or the imaging device 228, or for interpreting information or data captured by one or more onboard sensors, e.g., the altimeter 224, the position sensor 226 and/or the imaging device 228, or others (not shown). Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. For example, the memory 214 may be configured to store information or data regarding energy transmitted by the transmitters 230-1, 230-2 . . . 230-n, information or data captured by the receiver 240, or any other information or data. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The altimeter 224 may be any device, component, system, or instrument for determining an altitude of the aerial vehicle 210, and may include any number of barometers, transmitters, receivers, range finders (e.g., laser or radar), imaging devices or other features for determining altitudes above ground.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

Although the block diagram of the system 200 shown in FIG. 2 includes a single box for a propulsion motor 222, a single box for an altimeter 224, a single box for a position sensor 226 and a single box for an imaging device 228, those of ordinary skill in the pertinent arts will recognize that any number or type of propulsion motors, altimeters, position sensors and/or imaging devices may be provided aboard the aerial vehicle 210 in accordance with the present disclosure.

The transmitters (or transmitting elements) 230-1, 230-2 ... 230-$n$ are any devices or systems for transmitting energy that are configured to be mounted to a surface, e.g., one or more surfaces of the aerial vehicle 210, and aligned in a common line. In some embodiments, the transmitters 230-1, 230-2 ... 230-$n$ may be configured to emit acoustic signals in a single direction, or in multiple directions. For example, in some embodiments, the transmitters 230-1, 230-2 ... 230-$n$ may be configured to transmit continuous-wave (or "CW") pulses, e.g., pings, which may take the form of phase-coded transmit signals having bandwidths determined by the phase coding or frequency spread of the signals. Alternatively, in some other embodiments, the transmitters 230-1, 230-2 ... 230-$n$ may be configured to emit electromagnetic signals in one or more waves or pulses. Each of the transmitters 230-1, 230-2 ... 230-$n$ may be configured to transmit signals at any power level, frequency (e.g., center frequency), wavelength or bandwidth, and within any total frequency range.

The receiver 240 may be any device or system for receiving energy (e.g., acoustic energy or, alternatively, electromagnetic energy), or capturing information or data relating to received energy, that are configured to be mounted to a surface, e.g., one or more surfaces of the aerial vehicle 210. The receiver 240 may be configured to receive energy at any power level, frequency (e.g., center frequency), wavelength or bandwidth, and within any total frequency range.

In some embodiments, one or more of the transmitters 230-1, 230-2 ... 230-$n$ may also be a receiver, e.g., a transceiver. In some embodiments, the receiver 240 may also be a transmitter, e.g., a transceiver. Additionally, in some embodiments, one or more of the transmitters 230-1, 230-2 ... 230-$n$ or the receiver 240 may be configured to transmit or receive signals or energy of any type or form, or of multiple types or forms.

Although the block diagram of the system 200 shown in FIG. 2 includes three boxes corresponding to transmitters 230-1, 230-2 ... 230-$n$ and one box corresponding to the receiver 240, those of ordinary skill in the pertinent arts will recognize that any number or transmitters and receivers may be mounted in common lines that are perpendicular to one another in accordance with the present disclosure. For example, in some embodiments, the receiver 240 may be a single unit configured to receive energy, or to capture information or data relating to received energy. In some other embodiments, the receiver 240 may include one or more discrete units that are configured to receive energy, or to capture information or data relating to received energy. For example, the receiver 240 may be a synthetic aperture array receiver including a plurality of such units arranged in an array in the shape of a square or another shape. Moreover, the transmitters 230-1, 230-2 ... 230-$n$ and the receiver 240 may be mounted to any structure, such as any type of vehicle or other system, and are not limited for use in connection with the operation of aerial vehicles in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to signals transmitted by the aerial vehicle 210, along with times or positions of the aerial vehicle 210 at which energy including reflections of such signals was received, or imaging data captured using the imaging device 228, or, alternatively, provided in connection with one or more physical or virtual services that are configured to receive, analyze or store such information or data, or other information or data, as well as one or more other functions. The servers 282 may be connected to or otherwise communicate with the processors 284 and the data stores 286, which may store any type of information or data, including but not limited to information or data regarding maps or other cartographic representations, for any purpose.

The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to generate two-dimensional or three-dimensional maps or other representations of locations of objects, as determined based on angles at which signals are transmitted by the transmitters 230-1, 230-2 . . . 230-n, or bearings or angles to objects from which energy including reflections of the signals are captured by the receiver 240. In some embodiments, the processor 212, the servers 282 and/or the processors 284 may be configured to determine an optimal path or route between two locations for the execution of a given task by the aerial vehicle 210 or one or more other aerial vehicles (not shown). The processor 212, the servers 282 and/or the processors 284 may determine an optimal path or route based on any factor or element, including but not limited to times required to travel on any paths of an optimal route, any costs associated with traveling on the paths, or any other intrinsic or extrinsic factors, such as according to one or more traditional shortest path or shortest route algorithms.

The aerial vehicle 210 and/or the data processing system 280 may use any applications, features, or techniques to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Referring to FIG. 3, a flow chart 300 of one process for using pseudorandom signals transmitted from distributed sources in ranging operations in accordance with embodiments of the present disclosure is shown. At box 310, a first pseudorandom sequence is generated for a first transmitter. The first pseudorandom sequence may be any sequence selected on any basis, such as by a binary shift register or a linear-feedback shift register, or in any other manner. In some embodiments, the first pseudorandom sequence preferably has good auto-correlation qualities, such that the first pseudorandom sequence should match itself only, e.g., a delayed version of itself, in that the first pseudorandom sequence must be serially correlatable with a delayed version of the first pseudorandom sequence received by a receiver. In some embodiments, the first pseudorandom sequence preferably has poor cross-correlation qualities, in that the first pseudorandom sequence should not match with any other sequence. For example, in some embodiments, the first pseudorandom sequence may be a maximum length sequence. The first transmitter may be provided in association with any system, including but not limited to one or more surfaces of systems that are fixed in position, or one or more surfaces of mobile systems, e.g., vehicles such as aerial vehicles, ground-based vehicles, locomotives, seagoing vessels, or others.

At box 320, a second pseudorandom sequence is generated for a second transmitter. The second pseudorandom sequence may have the same properties as the first pseudorandom sequence, e.g., in that the second pseudorandom sequence preferably has good auto-correlation qualities and poor cross-correlation qualities, but must be distinguishable and recognizable from the first pseudorandom sequence as a different sequence. In some embodiments, the first transmitter and the second transmitter are provided at extended distances from one another. For example, where the first transmitter and the second transmitter are provided aboard an aerial vehicle, the first transmitter and the second transmitter may be mounted to tips of wings, propulsion motors, landing gear or other features, extensions, appurtenances or other aspects of the aerial vehicle, in order to maintain a discrete separation between the first transmitter and the second transmitter. Alternatively, any number of transmitters may be provided at extended distances from one another, and pseudorandom sequences may be generated for any of such transmitters.

At box 330, a first energy pulse having the first pseudorandom sequence is transmitted by the first transmitter. In parallel, at box 335, a second energy pulse having the second pseudorandom sequence is transmitted by the second transmitter, simultaneously or nearly simultaneously. For example, in some embodiments, the first energy pulse and the second energy pulse may be acoustic continuous-wave (or "CW") pulses, or pings, in the form of phase-coded transmit signals having bandwidths determined by a phase coding or frequency spread of the signals. In some embodiments, e.g., in radar operations, the first energy pulse and the second energy pulse may be electromagnetic energy pulses.

At box 340, a buffer of energy is captured by the receiver. The buffer may have any duration and may include any energy that may be captured by the receiver, e.g., acoustic energy of any frequency or bandwidth, for the duration of the buffer. The buffer may be stored in any type or form of memory component or data store.

At box 350, the first energy pulse is detected within the buffer of energy captured by the receiver. For example, the receiver or one or more computer devices or systems may recognize the first pseudorandom sequence within the buffer of energy, and determine that an energy pulse transmitted by the first transmitter was captured thereby. In some embodiments, the receiver or one or more of such devices or systems may be programmed to associate the first pseudorandom sequence with the first transmitter, and the second pseudorandom sequence with the second transmitter. For example, in some embodiments, the first transmitter, the second transmitter and the receiver are component parts of a monostatic system. Alternatively, the first transmitter, the second transmitter and the receiver may be component parts of a bistatic system, or any other multi-static system.

At box 360, a first range to an object is determined based on a time of flight of the first energy pulse from the first transmitter to the receiver. For example, a difference between a time at which the first energy pulse was transmitted and a time at which the first energy pulse is detected within the buffer of energy captured by the receiver may be multiplied by a speed of the energy within a medium, e.g., the speed of sound, or approximately three hundred forty-three meters per second (343 m/s) within dry air to determine a distance traveled by the first energy pulse from the transmitter to the object and reflected back to the receiver. A distance to the object may be determined by dividing the product (viz., the total distance traveled by the first energy pulse) by two.

Similarly, and in parallel, at box 355, the second energy pulse is detected within the buffer of energy captured by the receiver. For example, as is discussed above with regard to box 350, the receiver may recognize the second pseudorandom sequence within the buffer of energy and determine that an energy pulse transmitted by the second transmitter was captured thereby. At box 365, a second range to the object is determined based on a time of flight of the second energy pulse from the second transmitter to the receiver, e.g., by multiplying a difference between a time at which the second energy pulse was transmitted and a time at which the second energy pulse is detected within the buffer by the speed of sound, and dividing the product (viz., the total distance traveled by the second energy pulse) by two.

At box 370, whether ranging operations are to continue is determined. If the ranging operations are to continue, then the process returns to box 330, where the first energy pulse including the first pseudorandom sequence is transmitted again by the first transmitter, and to box 335, where the second energy pulse including the second pseudorandom sequence is transmitted again by the second transmitter in parallel. If the ranging operations are no longer required or desired, however, the process advances to box 380, where a representation of the scene is generated or updated based on the first range and the second range determined at box 360 and box 365, and the process ends.

Although the process embodied in the flow chart 300 of FIG. 3 includes a first transmitter and a second transmitter, and a single receiver, those of ordinary skill in the pertinent arts will recognize that systems and methods of the present disclosure may utilize and operate any number of transmitters and receivers, and are not limited to any of the numbers of transmitters or receivers referenced in any of the embodiments disclosed herein. For example, pseudorandom sequences may be generated and assigned to any number of transmitters, such as is described above with box 310 and box 320, and energy captured by any number of receivers may be processed to associate captured pseudorandom sequences with such transmitters, in accordance with the present disclosure. The transmitters may transmit energy pulses including such pseudorandom sequences simultaneously or nearly simultaneously, such as is described above with regard to box 330 and box 335, and reflections of such energy pulses may be detected within buffers of energy captured by the receivers, such as is described above with regard to box 340, box 350 and box 355. Ranges to objects may be determined based on such reflections, such as is described above with regard to box 360 and box 365, and a representation of a scene may be generated based on any number of such ranges, such as is described above with regard to box 380.

As is discussed above, pseudorandom signals may be transmitted by a plurality of transmitters simultaneously, and processed by a receiver simultaneously, to determine a plurality of distances or ranges to one or more objects from which the pseudorandom signals were reflected. Referring to FIGS. 4A through 4D, views of aspects of one system for using pseudorandom signals transmitted from distributed sources in ranging operations with embodiments of the present disclosure are shown. Except where otherwise noted, reference numerals preceded by the number "4" shown in FIGS. 4A through 4D indicate components or features that are similar to components or features having reference numerals preceded by the number "2" shown in FIG. 2 or by the number "1" shown in FIGS. 1A through 1F.

Figure 4A:
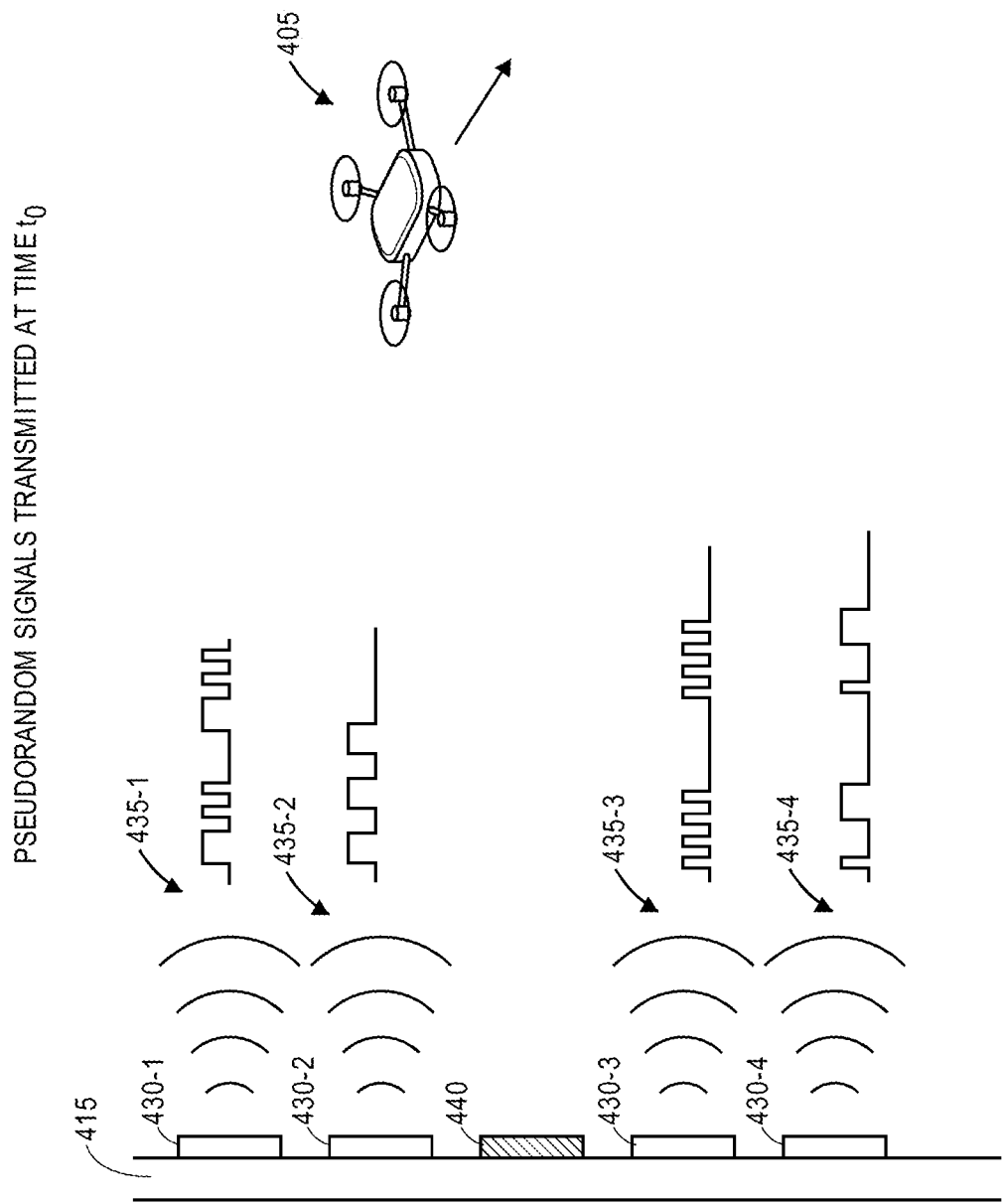
FIGS. 4A through 4D are views of aspects of one system for using pseudorandom signals transmitted from distributed sources in ranging operations in accordance with embodiments of the present disclosure.

As is shown in FIG. 4A, a plurality of transmitters 430-1, 430-2, 430-3, 430-4 and a receiver 440 are mounted to a frame 415. The transmitters 430-1, 430-2, 430-3, 430-4 are mounted at discrete locations with respect to one another, and programmed to transmit pseudorandom signals (e.g., signals encoded with pseudorandom sequences) at any wavelength or frequency. The receiver 440 may be configured to capture and interpret reflections of the energy as detected from one or more objects. In some embodiments, the receiver 440 may be a single receiving element. In some other embodiments, the receiver 440 may include one or more receiving elements, e.g., a synthetic aperture array of receiving elements.

As is shown in FIG. 4A, at a time $t_0$, each of the transmitters 430-1, 430-2, 430-3, 430-4 transmits a unique pseudorandom signal. For example, the first transmitter 430-1 transmits a first pseudorandom signal 435-1, while the second transmitter 430-2 transmits a second pseudorandom signal 435-2, the third transmitter 430-3 transmits a third pseudorandom signal 435-3 and the fourth transmitter 430-4 transmits a fourth pseudorandom signal 435-4. Each of the pseudorandom signals 435-1, 435-2, 435-3, 435-4 may include pseudorandom sequences that are unique and repeatable in nature, e.g., in the form of one or more pulses at selected power levels, frequencies, wavelengths or the like, and have strong auto-correlation qualities and weak cross-correlation qualities. Each of the pseudorandom signals 435-1, 435-2, 435-3, 435-4 is shown in FIG. 4A in the form of a square waveform with amplitudes varying between maximum and minimum values, at varying frequencies and durations. In some embodiments, the pseudorandom signals 435-1, 435-2, 435-3, 435-4 or the pseudorandom sequences encoded therein may be generated by a binary shift register or a linear-feedback shift register, or in any other manner.

Figure 4B:
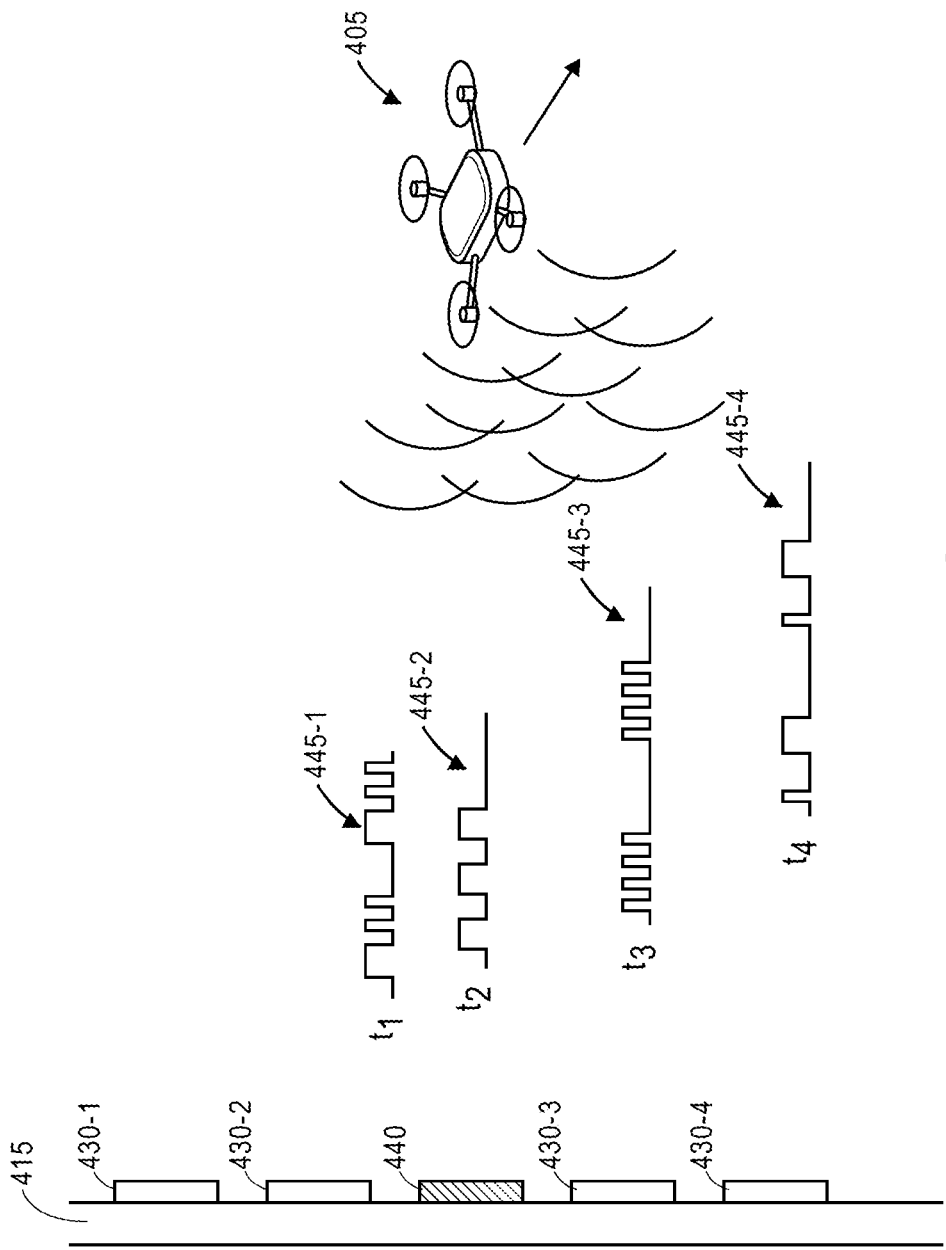

As is shown in FIG. 4B, data 445-1, 445-2, 445-3, 445-4 regarding reflections of the pseudorandom signals 435-1, 435-2, 435-3, 435-4 off an object 405 (viz., an operating vehicle) is captured by the receiver 440. The data 445-1, 445-2, 445-3, 445-4 includes all or portions of the pseudorandom signals 435-1, 435-2, 435-3, 435-4 transmitted by the transmitters 430-1, 430-2, 430-3, 430-4 at the time to. As is further shown in FIG. 4B, the data 445-1 is captured by the receiver 440 at a time $t_1$, while the data 445-2 is captured by the receiver 440 at a time $t_2$, the data 445-3 is captured by the receiver 440 at a time $t_3$ and the data 445-4 is captured by the receiver 440 at a time $t_4$.

Figure 4C:
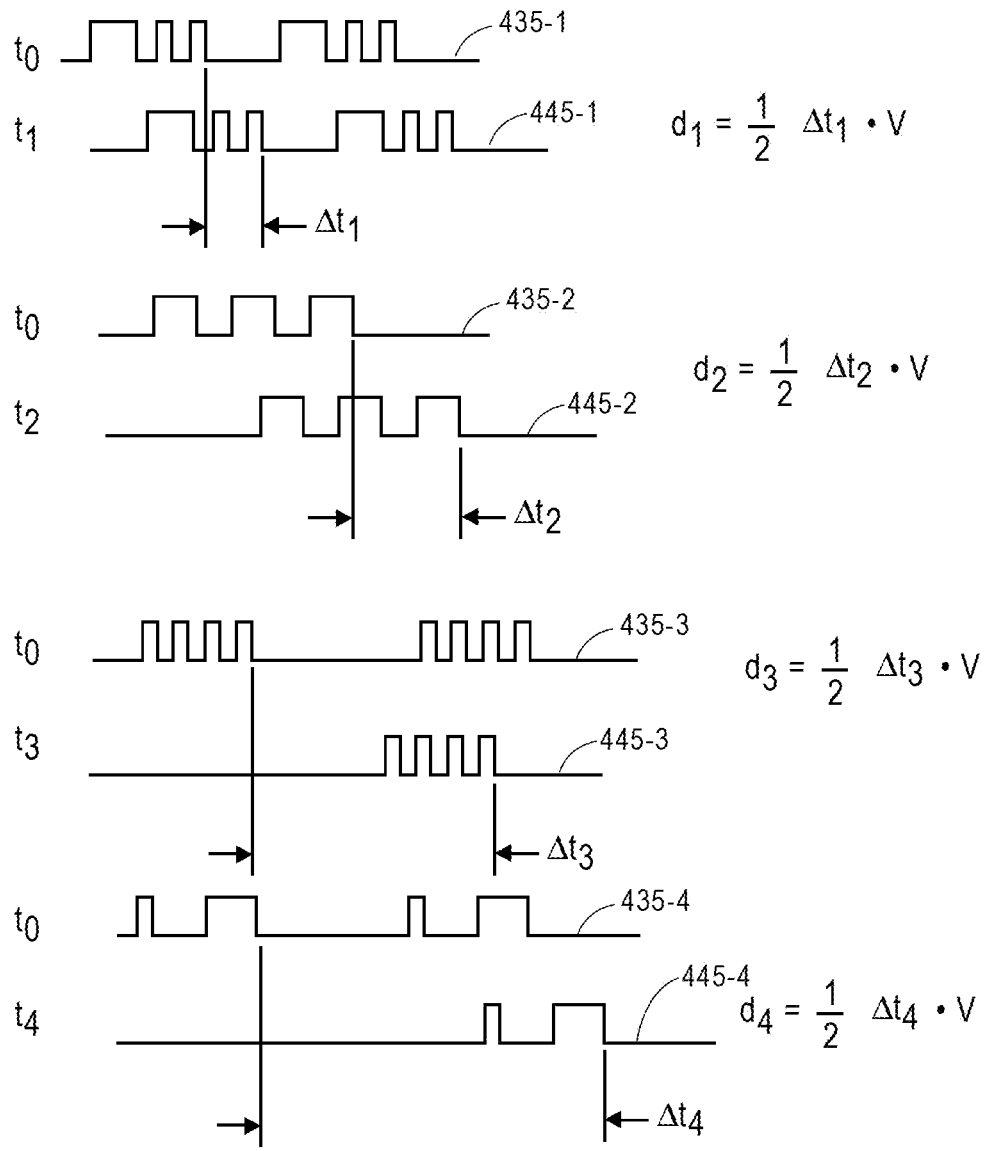

Times of flight of the pseudorandom signals 435-1, 435-2, 435-3, 435-4 may be determined based on differences in time when pseudorandom sequences of the pseudorandom signals 435-1, 435-2, 435-3, 435-4 are observed. As is shown in FIG. 4C, a difference in time $\Delta t_1$ is calculated based on the time $t_0$ and the time $t_1$ at which a trailing edge of the pseudorandom signal 435-1 is detected within data captured using the receiver 440. For example, because a pseudorandom sequence is typically auto-correlatable and not cross-correlatable, the pseudorandom signal 435-1 must be identified in its entirety before the receipt of the pseudorandom signal 435-1 may be confirmed.

Similarly, as is also shown in FIG. 4C, a difference in time $\Delta t_2$ is calculated based on the time $t_0$ and the time $t_2$ at which a trailing edge of the pseudorandom signal 435-2 is detected within data captured using the receiver 440, while a difference in time $\Delta t_3$ is calculated based on the time $t_0$ and the time $t_3$ at which a trailing edge of the pseudorandom signal 435-3 is detected within data captured using the receiver 440, and a difference in time $\Delta t_4$ is calculated based on the time $t_0$ and the time $t_4$ at which a trailing edge of the pseudorandom signal 435-4 is detected within data captured using the receiver 440.

Figure 4D:
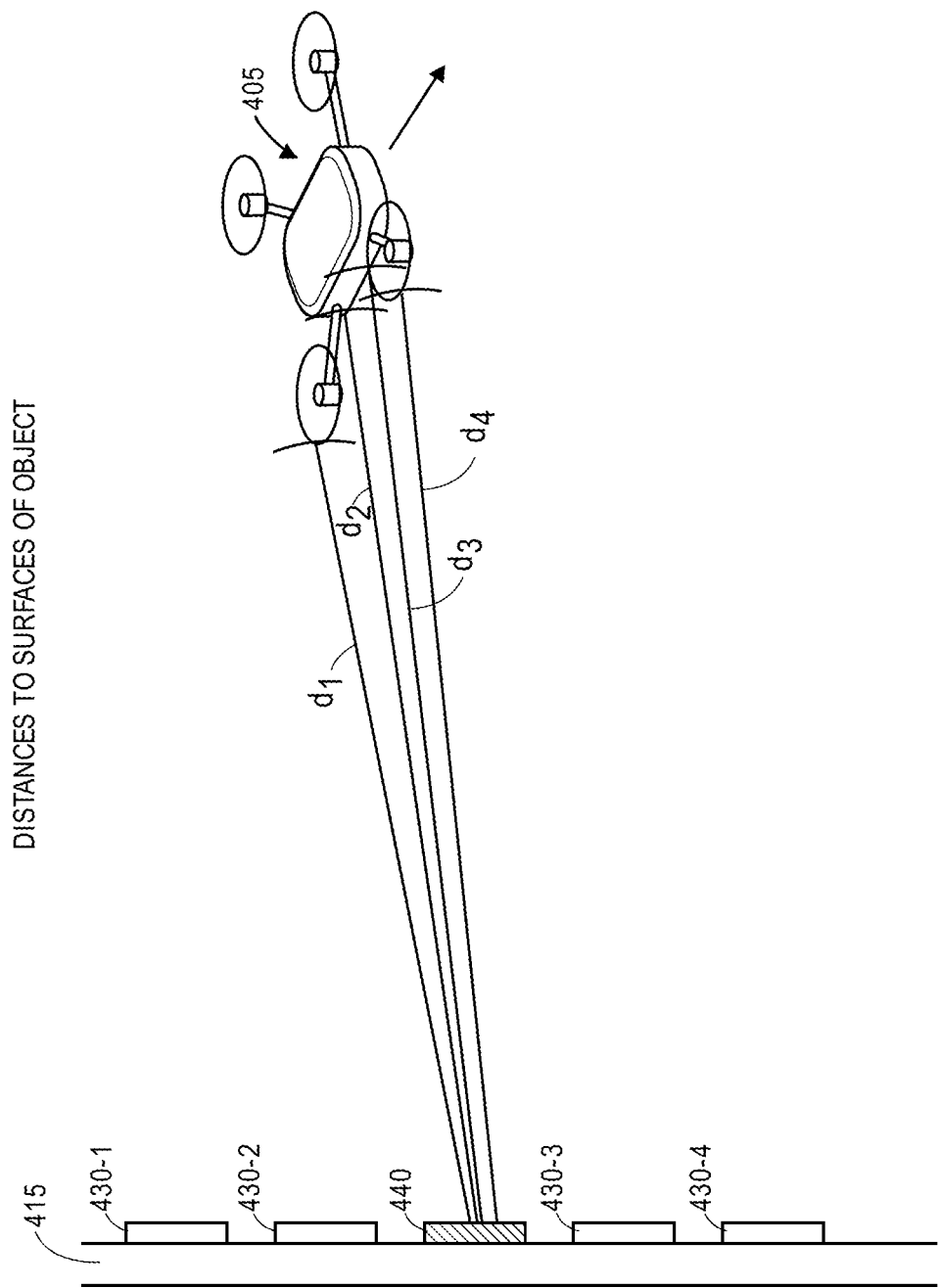

As is also shown in FIG. 4C, a distance $d_1$ may be calculated as one half of a product of the difference in time $\Delta t_1$ and a speed V of energy (e.g., the speed of sound or the speed of light). Likewise, a distance $d_2$ may also be calculated as one half of a product of the difference in time $\Delta t_2$ and the speed V of energy, while a distance $d_3$ may also be calculated as one half of a product of the difference in time $\Delta t_3$ and the speed V of energy, and a distance $d_4$ may also be calculated as one half of a product of the difference in time $\Delta t_4$ and the speed V of energy. As is shown in FIG. 4D, positions of surfaces of the object 405 may be determined based at least in part on the distances $d_1$, $d_2$, $d_3$, $d_4$. Because each of the ranges $d_1$, $d_2$, $d_3$, $d_4$ shown in FIG. 4D is independently determined based on respective differences in time $\Delta t_1$, $\Delta t_2$, $\Delta t_3$, $\Delta t_4$ shown in FIG. 4C, an aerial vehicle comprising the frame 415 may determine one or more distances to the object 405 regardless of whether any of the signals 435-1, 435-2, 435-3, 435-4 is subject to specular reflection or other interference or defects.

Figure 5A:
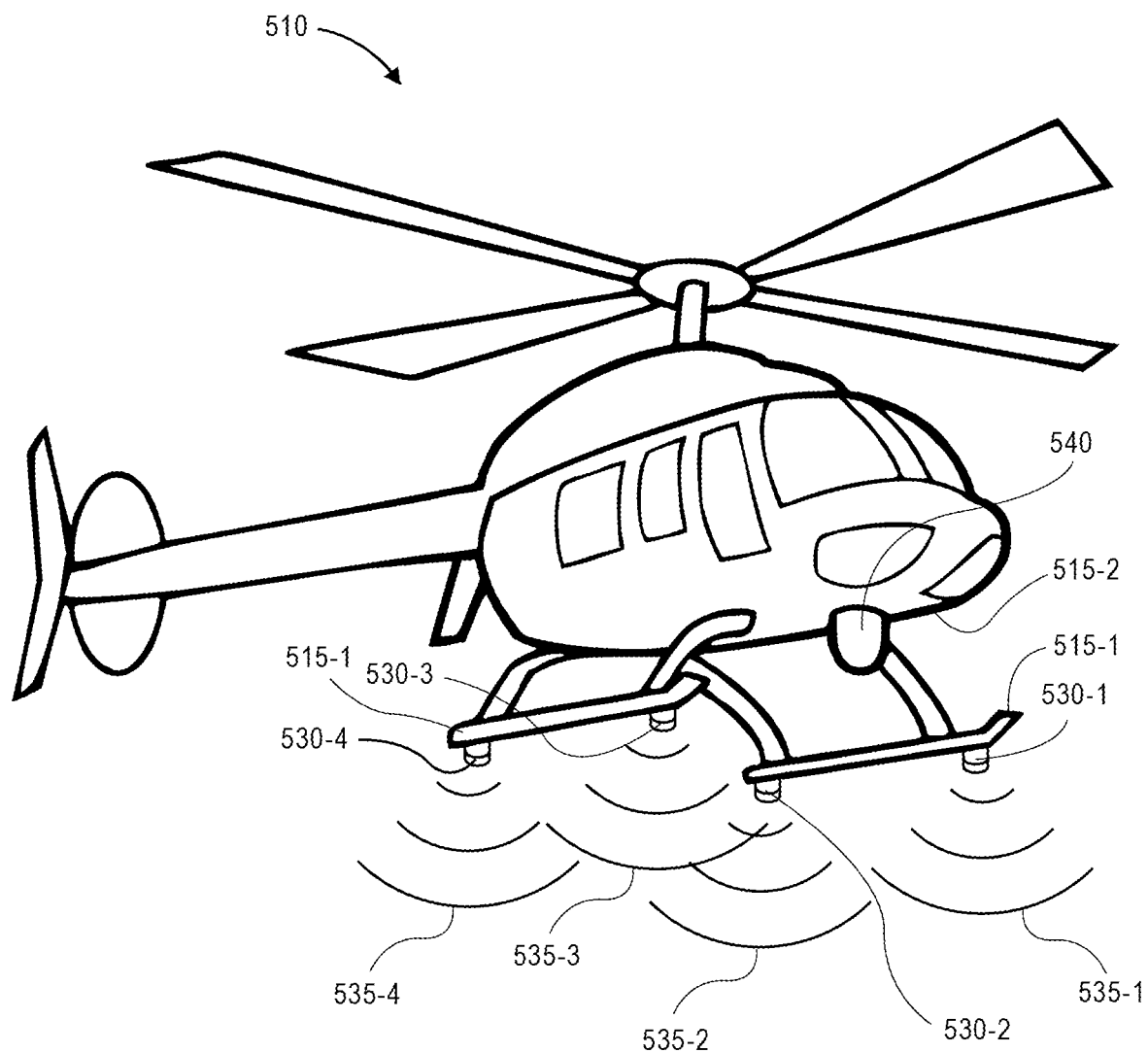
FIGS. 5A and 5B are views of aspects of one system for using pseudorandom signals transmitted from distributed sources in ranging operations in accordance with embodiments of the present disclosure.
Figure 5B:
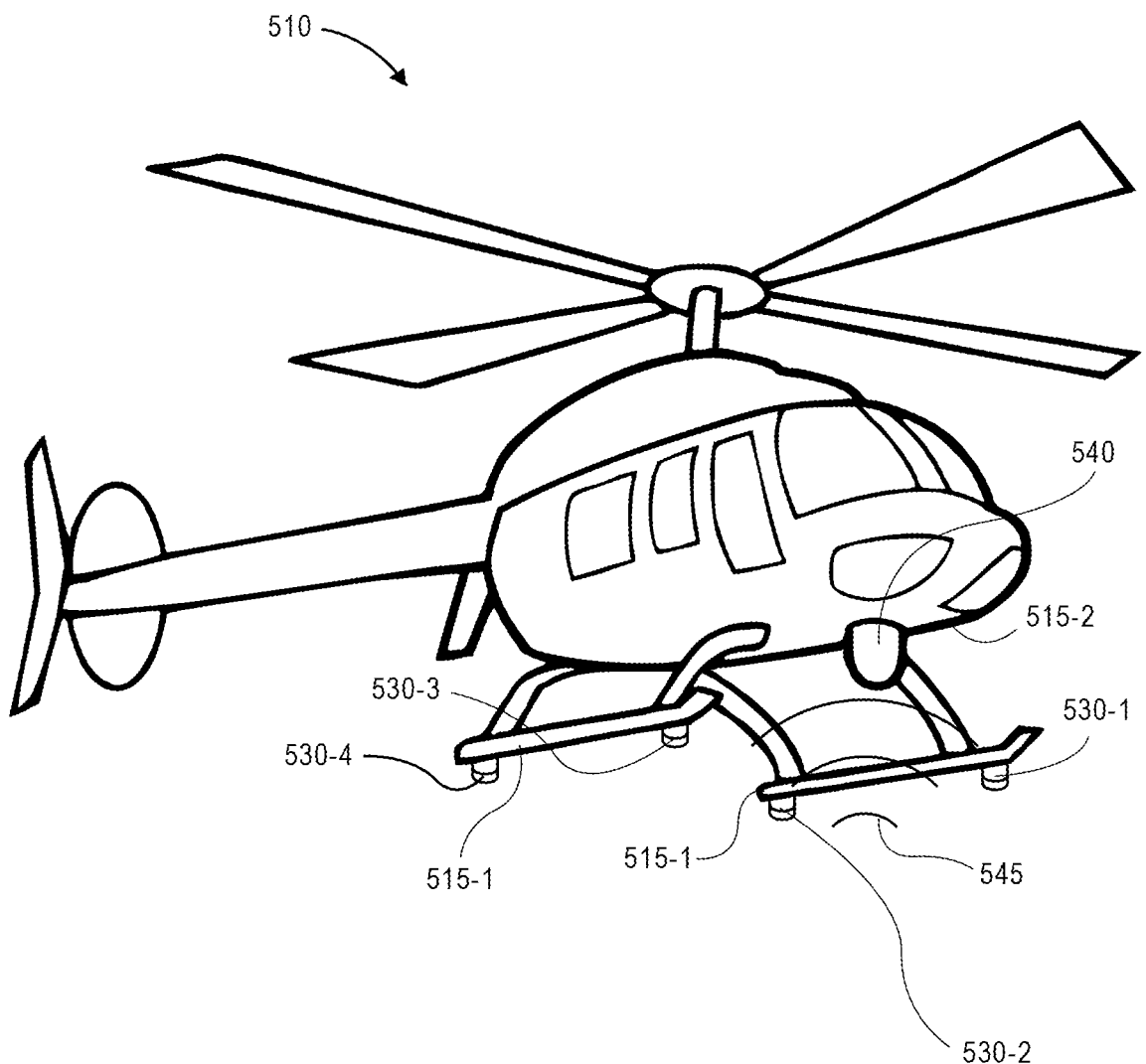

As is discussed above, the systems and methods of the present disclosure may be employed by any fixed or mobile system, including but not limited to any type of vehicle. Referring to FIGS. 5A and 5B, views of aspects of one system for using pseudorandom signals transmitted from distributed sources in ranging operations in accordance with embodiments of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A through 4D, by the number "2" shown in FIG. 2 or by the number "1" shown in FIGS. 1A through 1F.

As is shown in FIGS. 5A and 5B, an aerial vehicle 510 (viz., a helicopter) includes a set of landing skids 515-1, a cabin 515-2, a plurality of transmitters 530-1, 530-2, 530-3, 530-4 and a receiver 540. As is shown in FIG. 5A, the plurality of transmitters 530-1, 530-2, 530-3, 530-4 are disposed at ends of the respective landing skids 515-1 and configured to transmit unique pseudorandom signals 535-1, 535-2, 535-3, 535-4. Therefore, the transmitters 530-1, 530-2, 530-3, 530-4 are separated by distances defined by the dimensions of the landing skids 515-1 of the set, ensuring that pseudorandom signals 535-1, 535-2, 535-3, 535-4 transmitted by each of the transmitters 530-1, 530-2, 530-3, 530-4 approach ground surfaces or other objects from disparate positions. In this regard, the configuration of the transmitters 530-1, 530-2, 530-3, 530-4 on the aerial vehicle 510 enhances a probability that one or more reflections of the pseudorandom signals 535-1, 535-2, 535-3, 535-4 are received by the receiver 540, regardless of surface conditions or other operating conditions in an area where the aerial vehicle 510 operates.

As is shown in FIG. 5B, the receiver 540 is mounted to an underside of the cabin 515-2, e.g., to a lower portion of a frame of the aerial vehicle 510, in a substantially central location along a longitudinal axis of the aerial vehicle 510 and along or proximate a lateral axis of the aerial vehicle 510. The receiver 540 may capture energy including reflections of the respective pseudorandom signals 535-1, 535-2, 535-3, 535-4, e.g., in a buffer of data 545, and be configured to interpret the buffer of data 545 captured thereby to determine which of the data 545 corresponds to reflections of the respective signals 535-1, 535-2, 535-3, 535-4. Distance calculations may be independently made based on the times of flight of the respective signals 535-1, 535-2, 535-3, 535-4. In some embodiments, the receiver 540 may be a single receiving element. In some other embodiments, the receiver 540 may include one or more receiving elements, e.g., a synthetic aperture array of receiving elements.

Figure 6A:
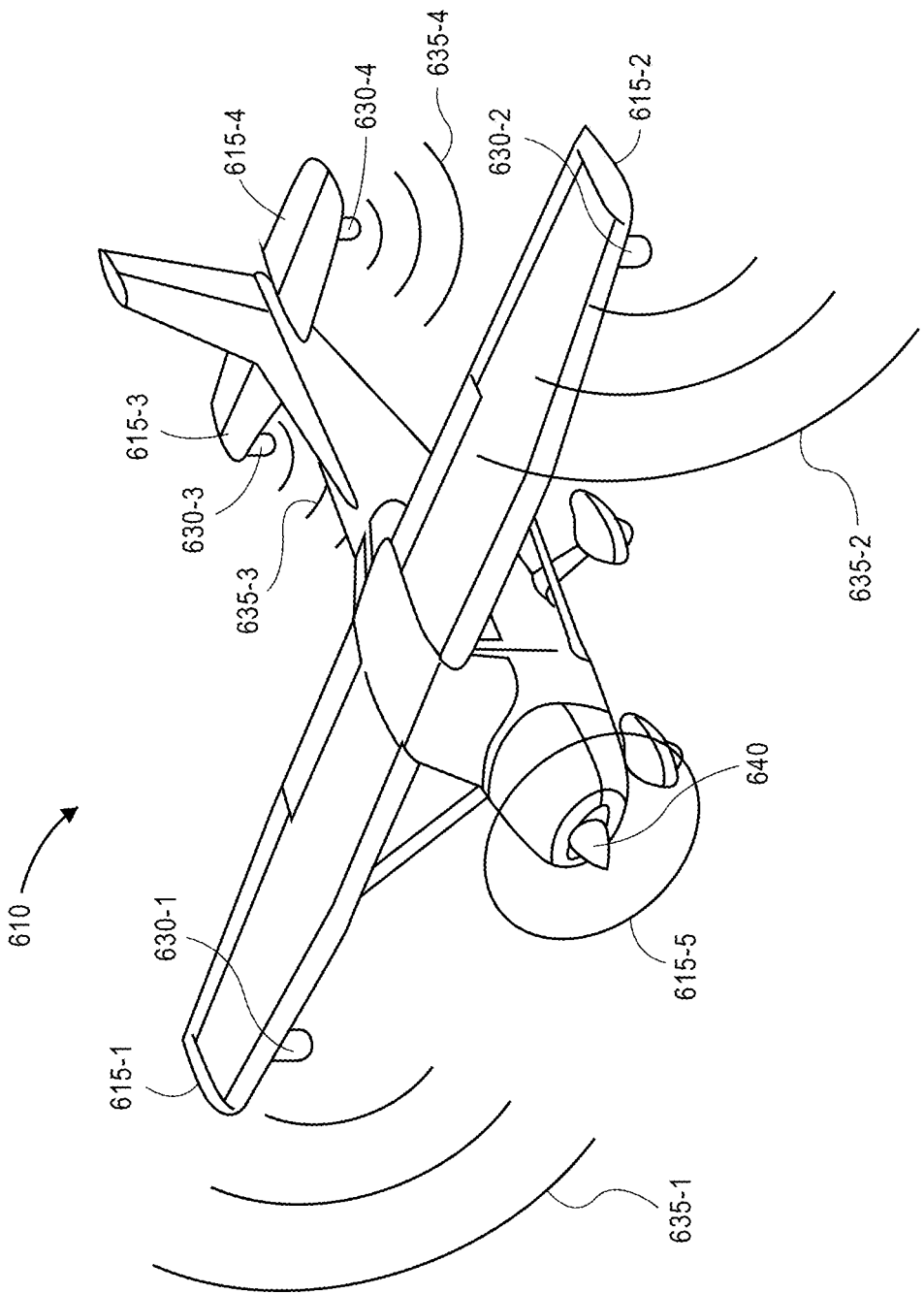
FIGS. 6A and 6B are views of aspects of one system for using pseudorandom signals transmitted from distributed sources in ranging operations in accordance with embodiments of the present disclosure.
Figure 6B:
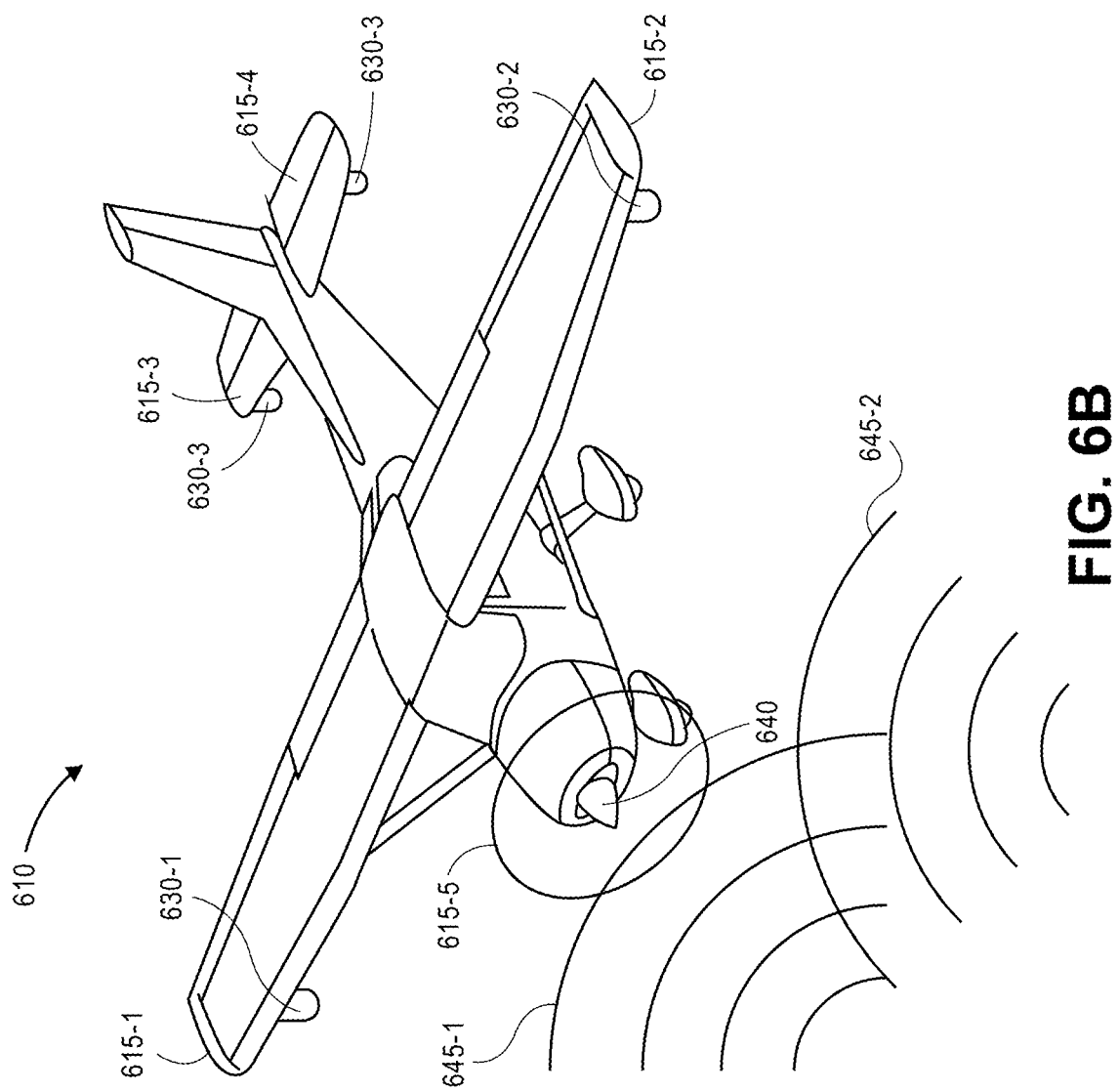

Referring to FIGS. 6A and 6B, views of aspects of one system for using pseudorandom signals transmitted from distributed sources in ranging operations in accordance with embodiments of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A and 5B, by the number "4" shown in FIGS. 4A through 4D, by the number "2" shown in FIG. 2 or by the number "1" shown in FIGS. 1A through 1F.

As is shown in FIGS. 6A and 6B, an aerial vehicle 610 (viz., a fixed-wing aircraft) includes a pair of wings 615-1, 615-2, a pair of stabilizers 615-3, 615-4, a propeller 615-5, a plurality of transmitters 630-1, 630-2, 630-3, 630-4 and a receiver 640. As is shown in FIG. 6A, the plurality of transmitters 630-1, 630-2 are disposed at ends of the respective wings 615-1, 615-2, and configured to transmit unique pseudorandom signals 635-1, 635-2. Therefore, the transmitters 630-1, 630-2 are separated by distances defined by the lengths of the wings 615-1, 615-2. For example, a distance between the transmitters 630-1, 630-2 is approximately twice the length of a distance between either of the transmitters 630-1, 630-2 and the receiver 640. Additionally, the transmitters 630-1, 630-2 are aligned and configured to transmit pseudorandom signals 635-1, 635-2 in a forward direction with respect to an orientation of the aerial vehicle 610, ensuring that the pseudorandom signals 635-1, 635-2 transmitted by each of the transmitters 630-1, 630-2 approach objects forward of the aerial vehicle 610 from disparate positions.

As is also shown in FIG. 6A, the transmitters 630-3, 630-4 are disposed at ends of the respective stabilizers 615-3, 615-4, and configured to transmit unique pseudorandom signals 635-3, 635-4. Therefore, the transmitters 630-3, 630-4 are separated by distances defined by the lengths of the stabilizers 615-3, 615-4. Additionally, the transmitters 630-3, 630-4 are aligned and configured to transmit pseudorandom signals 635-3, 635-4 in a downward direction with respect to an orientation of the aerial vehicle 610, ensuring that the pseudorandom signals 635-3, 635-4 transmitted by each of the transmitters 630-3, 630-4 approach ground surfaces or other objects below the aerial vehicle 610 from disparate positions. In some embodiments, the receiver 640 may be a single receiving element. In some other embodiments, the receiver 640 may include one or more receiving elements, e.g., a synthetic aperture array of receiving elements.

In this regard, the configuration of the transmitters 630-1, 630-2 oriented forward of the aerial vehicle 610 and the transmitters 630-3, 630-4 oriented downward with respect to the aerial vehicle 610 enhances a probability that one or more reflections of the pseudorandom signals 635-1, 635-2, 635-3, 635-4 are received by the receiver 640, regardless of surface conditions or other operating conditions in an area where the aerial vehicle 610 operates.

As is shown in FIG. 6B, the receiver 640 is mounted to a hub of the propeller 615-5. Energy captured by the receiver 640, e.g., in buffers of data 645-1, 645-2, may be processed to determine which of the data corresponds to which of the pseudorandom signals 635-1, 635-2, 635-3, 635-4, or to independently make distance calculations in forward or downward directions based on the times of flight of the respective signals 635-1, 635-2, 635-3, 635-4. For example, the buffer of data 645-1 may be processed to identify reflections of the respective signals 635-1, 635-2 included therein, and to determine which of the data 645-1 corresponds to reflections of the respective signals 635-1, 635-2 forward of the aerial vehicle 610. Distance calculations may be independently made based on the times of flight of the respective signals 635-1, 635-2. Similarly, the buffer of data 645-2 may be processed to determine which of the data 645-2 corresponds to reflections of the respective signals 635-3, 635-4 below the aerial vehicle 610, and distance calculations may be independently made based on the times of flight of the respective signals 635-3, 635-4.

Figure 7A:
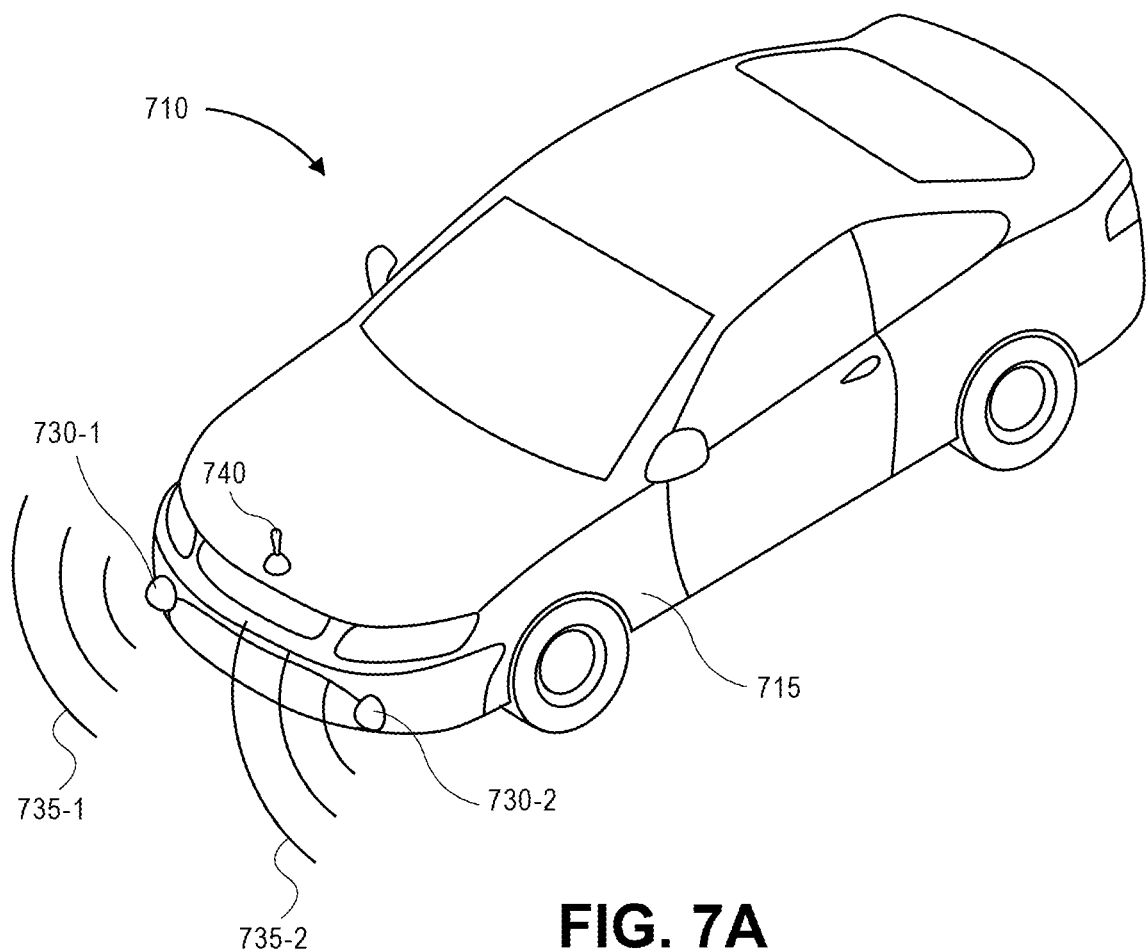
FIGS. 7A and 7B are views of aspects of one system for using pseudorandom signals transmitted from distributed sources in ranging operations in accordance with embodiments of the present disclosure.
Figure 7B:
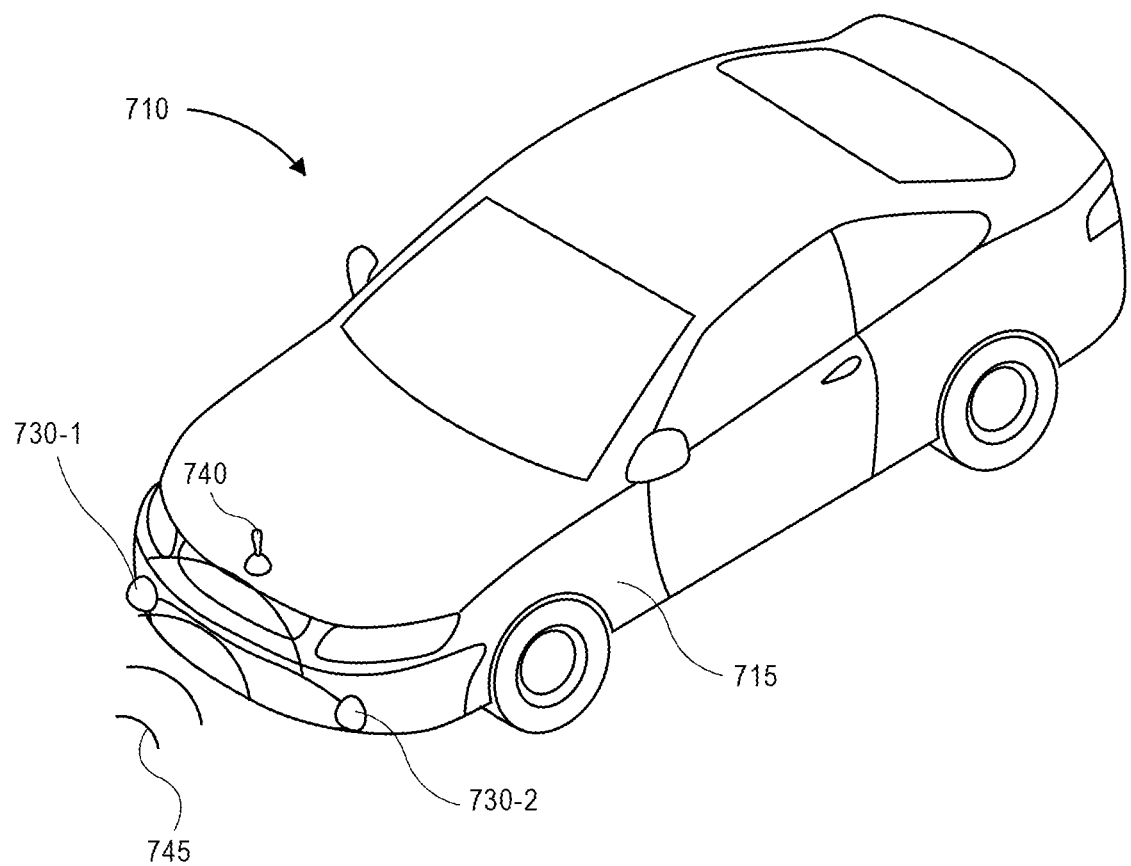

Referring to FIGS. 7A and 7B, views of aspects of one system for using pseudorandom signals transmitted from distributed sources in ranging operations in accordance with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A and 6B, by the number "5" shown in FIGS. 5A and 5B, by the number "4" shown in FIGS. 4A through 4D, by the number "2" shown in FIG. 2 or by the number "1" shown in FIGS. 1A through 1F.

As is shown in FIGS. 7A and 7B, a vehicle 710 (viz., an automobile, which may be operated by a human or autonomously) includes a frame 715, a pair of transmitters 730-1, 730-2 and a receiver 740. The transmitters 730-1, 730-2 are on a forward face of the frame 715, e.g., on left and right (or port and starboard) sides of the frame 715. Therefore, the transmitters 730-1, 730-2 are separated by a distance defined by the width of the frame 715. Additionally, as is shown in FIG. 7A, the transmitters 730-1, 730-2 are aligned and configured to transmit pseudorandom signals 735-1, 735-2 in a forward direction with respect to an orientation of the vehicle 710, ensuring that the pseudorandom signals 735-1, 735-2 transmitted by each of the transmitters 730-1, 730-2 approach objects forward of the aerial vehicle 710 from disparate positions.

In this regard, the configuration of the transmitters 730-1, 730-2 on the vehicle 710 enhances a probability that one or more reflections of the pseudorandom signals 735-1, 735-2 are received by the receiver 740, regardless of the operating conditions in an area where the vehicle 710 operates. In some embodiments, the receiver 740 may be a single receiving element. In some other embodiments, the receiver 740 may include one or more receiving elements, e.g., a synthetic aperture array of receiving elements.

As is shown in FIG. 7B, the receiver 740 is also mounted to the forward face of the frame 715, and may be programmed with information or data regarding the pseudorandom signals 735-1, 735-2. Therefore, a buffer of data 745 captured by the receiver 740 may be processed to determine which of the data 745 corresponds to which of the pseudorandom signals 735-1, 735-2 or to independently make distance calculations in a forward direction based on the times of flight of the respective signals 735-1, 735-2.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, as is discussed above, the transmitters and/or receivers may be mounted to surfaces of mobile vehicles (e.g., aerial vehicles, ground-based vehicles, locomotives, seagoing vessels, or others), or to surfaces that are fixed in position, and utilized for any purpose, such as to generate maps or other representations of distances to objects as determined by such systems.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3, in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more maps or other cartographic representations of energy levels are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
    a frame;
    a first transmitter mounted to the frame at a first location on the aerial vehicle;
    a second transmitter mounted to the frame at a second location on the aerial vehicle;
    at least one receiver mounted to the frame at a third location; and
    a control system having at least one computer processor, wherein the control system is in communication with the first transmitter, the second transmitter and the at least one receiver, and
    wherein the control system is programmed with instructions for executing a method comprising:
        configuring the first transmitter to transmit a first pseudorandom sequence in at least a first direction;
        configuring the second transmitter to transmit a second pseudorandom sequence in at least a second direction;
        causing the first transmitter to transmit a first signal comprising the first pseudorandom sequence in at least the first direction at a first time;
        causing the second transmitter to transmit a second signal comprising the second pseudorandom sequence in at least the second direction at the first time;
        capturing a buffer of data by the at least one receiver after the first time;
        determining, based at least in part on the buffer of data, that the first pseudorandom sequence was captured at a second time;
        determining, based at least in part on the buffer of data, that the second pseudorandom sequence was captured at a third time;
        determining at least a first distance to at least one object based at least in part on a difference between the first time and the second time; and
        determining at least a second distance to the at least one object based at least in part on a difference between the first time and the third time.

2. The aerial vehicle of claim 1, wherein the first pseudorandom sequence is different from the second pseudorandom sequence.

3. The aerial vehicle of claim 1, wherein the first location is a portion of one of a first wing coupled to the frame, a first control surface coupled to the frame or a first propulsion motor coupled to the frame, and wherein the second location is a portion of one of a second wing coupled to the frame, a second control surface coupled to the frame or a second propulsion motor coupled to the frame.

4. The aerial vehicle of claim 1, wherein the first signal is a first acoustic pulse having the first pseudorandom sequence encoded therein, and
wherein the second signal is a second acoustic pulse having the second pseudorandom sequence encoded therein.

5. The aerial vehicle of claim 1, wherein the at least one receiver is a synthetic aperture array mounted to the frame at the third location.

6. A method comprising:
transmitting, by a first transmitter, a first signal comprising a first pseudorandom sequence at a first time;
transmitting, by a second transmitter, a second signal comprising a second pseudorandom sequence at approximately the first time;
capturing energy by at least one receiver;
determining, based at least in part on the data, that a reflection of the first pseudorandom sequence was captured by the at least one receiver at a second time;
determining, based at least in part on the data, that the second pseudorandom sequence was captured by the at least one receiver at a third time; and
calculating a range to at least one object based at least in part on at least one of:
a difference between the first time and the second time; or
a difference between the first time and the third time.

7. The method of claim 6, further comprising:
generating the first pseudorandom sequence by a first linear feedback shift register;
assigning the first pseudorandom sequence to the first transmitter;
generating the second pseudorandom sequence by a second linear feedback shift register; and
assigning the second pseudorandom sequence to the second transmitter.

8. The method of claim 6, wherein the first signal is a first acoustic pulse having the first pseudorandom sequence encoded therein, and
wherein the second signal is a second acoustic pulse having the second pseudorandom sequence encoded therein.

9. The method of claim 6, wherein the at least one receiver is a synthetic aperture array.

10. The method of claim 6, wherein the first transmitter is mounted to a frame of a vehicle at a first location and configured to transmit signals at least perpendicular to the frame at the first location,
wherein the second transmitter is mounted to the frame at a second location and configured to transmit signals at least perpendicular to the frame at the second location, and
wherein the at least one receiver is mounted to the frame at a third location.

11. The method of claim 10, wherein the vehicle is one of an autonomous mobile robot or an aerial vehicle, and
wherein each of the first location and the second location is on one of a forward face or an underside of the vehicle.

12. The method of claim 6, wherein the range is at least one of:
one-half of a first product of a speed of the first signal and the difference between the first time and the second time; or
one-half of a second product of a speed of the second signal and the difference between the first time and the third time.

13. The method of claim 12, further comprising:
determining that the difference between the first time and the second time is indefinite; and
determining that the range is one-half of the second product.

14. The method of claim 6, wherein the first pseudorandom sequence is different from the second pseudorandom sequence.

15. The method of claim 6, wherein the first time corresponds to a trailing edge of the first pseudorandom sequence transmitted by the first transmitter, and
wherein the second time corresponds to the trailing edge of the first pseudorandom sequence received by the at least one receiver.

16. A vehicle comprising:
a frame;
a plurality of transmitters mounted to the frame, wherein each of the transmitters is configured to transmit a respective signal comprising a respective unique pseudorandom sequence;
at least one receiver mounted to the frame; and
a control system having at least one computer processor, wherein the control system is in communication with each of the transmitters and the at least one receiver, and
wherein the control system is configured to execute a method comprising:
transmitting a plurality of signals by the plurality of transmitters at a first time, where each of the signals transmitted by a respective one of the plurality of transmitters comprises the respective unique pseudorandom sequence associated with the respective one of the plurality of transmitters;
capturing data by the at least one receiver, wherein the data comprises at least some of the plurality of signals comprising respective unique pseudorandom sequences;
determining, based at least in part on the captured data, a time at which the at least some of the plurality of signals comprising respective unique pseudorandom sequences were captured by the at least one receiver; and
calculating, based at least in part on the first time and the times at which the at least some of the plurality of signals comprising respective unique pseudorandom sequences were captured, a distance to at least a portion of an object.

17. The vehicle of claim 16, wherein the each of the plurality of signals is an acoustic pulse having the respective unique pseudorandom sequence encoded therein.

18. The vehicle of claim 16, wherein the at least one receiver is a synthetic aperture array.

19. The vehicle of claim 16, wherein the vehicle is an aerial vehicle, and
wherein each of the first transmitter and the second transmitter is aligned in a downward orientation with respect to the aerial vehicle.

* * * * *

UNITED STATES PATENT AND TRADEMARK OFFICE
CERTIFICATE OF CORRECTION

| | | |
|---|---|---|
| PATENT NO. | : 11,366,221 B1 | Page 1 of 1 |
| APPLICATION NO. | : 16/174020 | |
| DATED | : June 21, 2022 | |
| INVENTOR(S) | : Parodi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this
Twenty-second Day of November, 2022

*Katherine Kelly Vidal*

Katherine Kelly Vidal
*Director of the United States Patent and Trademark Office*